(12) United States Patent
Wehnes et al.

(10) Patent No.: US 8,923,594 B2
(45) Date of Patent: Dec. 30, 2014

(54) SPICULATED MALIGNANT MASS DETECTION AND CLASSIFICATION IN RADIOGRAPHIC IMAGE

(75) Inventors: Jeffrey C. Wehnes, Richardson, TX (US); David S. Harding, Austin, TX (US)

(73) Assignee: vuCOMP, Inc., Plano, TX (US)

( * ) Notice: Subject to any disclaimer, the term of this patent is extended or adjusted under 35 U.S.C. 154(b) by 204 days.

(21) Appl. No.: 13/695,369

(22) PCT Filed: Apr. 29, 2011

(86) PCT No.: PCT/US2011/034699
§ 371 (c)(1),
(2), (4) Date: Nov. 26, 2012

(87) PCT Pub. No.: WO2011/137410
PCT Pub. Date: Nov. 3, 2011

(65) Prior Publication Data
US 2013/0208956 A1 Aug. 15, 2013

Related U.S. Application Data

(60) Provisional application No. 61/343,557, filed on Apr. 30, 2010, provisional application No. 61/343,552, filed on May 2, 2010, provisional application No. 61/343,608, filed on May 2, 2010, provisional application No. 61/343,609, filed on May 2, 2010, provisional application No. 61/395,029, filed on May 6, 2010, provisional application No. 61/398,571, filed on Jun. 25, 2010, provisional application No. 61/399,094, filed on Jul. 7, 2010, provisional application No. 61/400,573, filed on Jul. 28, 2010.

(51) Int. Cl.
*G06K 9/00* (2006.01)
*G06K 9/62* (2006.01)
*G06T 7/00* (2006.01)

(52) U.S. Cl.
CPC ..... *G06T 7/0012* (2013.01); *G06T 2207/10116* (2013.01); *G06T 2207/30096* (2013.01); *G06K 9/6267* (2013.01); *G06T 7/0081* (2013.01); *G06T 7/0087* (2013.01); *G06T 2207/30068* (2013.01); *G06T 2207/20016* (2013.01)
USPC .......................................... 382/132; 382/195

(58) Field of Classification Search
USPC .................................................. 382/132, 195
See application file for complete search history.

(56) References Cited

U.S. PATENT DOCUMENTS 4,907,156 A 3/1990 Doi et al.
5,109,430 A 4/1992 Nishihara et al.
(Continued)

FOREIGN PATENT DOCUMENTS

WO WO 2011/137407 11/2011
WO WO 2011/137409 11/2011
(Continued)

OTHER PUBLICATIONS

Ball et al., "Digital Mammogram Spiculated Mass Detection and Spicule Segmentation using Level Sets", Proceedings of the 29th Annual International Conference of the IEEE EMBS, 2007.*
(Continued)

*Primary Examiner* — Katrina Fujita
(74) *Attorney, Agent, or Firm* — Slater & Matsil, L.L.P.

(57) ABSTRACT

An image analysis embodiment comprises generating a bulge mask from a digital image, the bulge mask comprising potential convergence hubs for spiculated anomalies, detecting ridges in the digital image to generate a detected ridges map, projecting the detected ridges map onto a set of direction maps having different directional vectors to generate a set of ridge direction) projection maps, determining wedge features for the potential convergence hubs from the set of ridge direction projection maps, selecting ridge convergence hubs from the potential convergence hubs having strongest wedge features, extracting classification features for each of the selected ridge convergence hubs, and classifying the selected ridge convergence hubs based on the extracted classification features.

18 Claims, 17 Drawing Sheets

(56) References Cited

U.S. PATENT DOCUMENTS

| | | |
|---|---|---|
| 5,133,020 A | 7/1992 | Giger et al. |
| 5,301,129 A | 4/1994 | McKaughan et al. |
| 5,359,513 A | 10/1994 | Kano et al. |
| 5,627,907 A | 5/1997 | Gur et al. |
| 5,638,458 A | 6/1997 | Giger et al. |
| 5,729,620 A | 3/1998 | Wang |
| 5,790,690 A | 8/1998 | Doi et al. |
| 5,828,774 A | 10/1998 | Wang |
| 5,917,929 A | 6/1999 | Marshall et al. |
| 5,974,169 A | 10/1999 | Bachelder |
| 5,982,915 A | 11/1999 | Doi et al. |
| 5,987,094 A | 11/1999 | Clarke et al. |
| 5,999,639 A | 12/1999 | Rogers et al. |
| 6,011,862 A | 1/2000 | Doi et al. |
| 6,014,452 A | 1/2000 | Zhang et al. |
| 6,075,879 A | 6/2000 | Roehrig et al. |
| 6,088,473 A | 7/2000 | Xu et al. |
| 6,125,194 A | 9/2000 | Yeh et al. |
| 6,138,045 A | 10/2000 | Kupinski et al. |
| 6,141,437 A | 10/2000 | Xu et al. |
| 6,198,838 B1 | 3/2001 | Roehrig et al. |
| 6,233,364 B1 | 5/2001 | Krainiouk et al. |
| 6,240,201 B1 | 5/2001 | Xu et al. |
| 6,246,782 B1* | 6/2001 | Shapiro et al. ............ 382/128 |
| 6,282,307 B1 | 8/2001 | Armato, III et al. |
| 6,335,980 B1 | 1/2002 | Armato, III et al. |
| 6,404,908 B1 | 6/2002 | Schneider et al. |
| 6,483,934 B2 | 11/2002 | Armato, III et al. |
| 6,549,646 B1 | 4/2003 | Yeh et al. |
| 6,577,752 B2 | 6/2003 | Armato, III et al. |
| 6,609,021 B1 | 8/2003 | Fan et al. |
| 6,654,728 B1 | 11/2003 | Li et al. |
| 6,683,973 B2 | 1/2004 | Li et al. |
| 6,690,816 B2 | 2/2004 | Aylward et al. |
| 6,694,046 B2 | 2/2004 | Doi et al. |
| 6,724,925 B2 | 4/2004 | Armato, III et al. |
| 6,738,499 B1 | 5/2004 | Doi et al. |
| 6,757,415 B1 | 6/2004 | Rogers et al. |
| 6,760,468 B1 | 7/2004 | Yeh et al. |
| 6,766,043 B2 | 7/2004 | Zeng et al. |
| 6,795,521 B2 | 9/2004 | Hsu et al. |
| 6,801,645 B1 | 10/2004 | Collins et al. |
| 6,813,375 B2 | 11/2004 | Armato III et al. |
| 6,891,964 B2* | 5/2005 | Doi et al. ............ 382/131 |
| 6,909,797 B2* | 6/2005 | Romsdahl et al. ......... 382/131 |
| 6,937,776 B2 | 8/2005 | Li et al. |
| 7,043,066 B1 | 5/2006 | Doi et al. |
| 7,054,473 B1 | 5/2006 | Roehrig et al. |
| 7,088,850 B2 | 8/2006 | Wei et al. |
| 7,203,349 B2 | 4/2007 | Zhang et al. |
| 7,274,810 B2 | 9/2007 | Reeves et al. |
| 7,298,883 B2 | 11/2007 | Giger et al. |
| 7,336,809 B2 | 2/2008 | Zeng et al. |
| 7,346,202 B1 | 3/2008 | Schneider |
| 7,359,538 B2 | 4/2008 | Zeng et al. |
| 7,397,938 B2 | 7/2008 | Cathier |
| 7,403,646 B2 | 7/2008 | Sato |
| 7,418,131 B2 | 8/2008 | Wang et al. |
| 7,480,401 B2 | 1/2009 | Shen et al. |
| 7,492,968 B2 | 2/2009 | Jerebko et al. |
| 7,593,561 B2 | 9/2009 | Zhang et al. |
| 7,616,818 B2 | 11/2009 | Dewaele |
| 7,646,902 B2 | 1/2010 | Chan et al. |
| 7,773,794 B2* | 8/2010 | Russakoff ............ 382/132 |
| 8,164,039 B2 | 4/2012 | Bovik et al. |
| 8,165,385 B2 | 4/2012 | Reeves et al. |
| 8,260,014 B2 | 9/2012 | Chen et al. |
| 8,488,863 B2 | 7/2013 | Boucheron |
| 8,503,742 B2 | 8/2013 | Dewaele et al. |
| 2001/0008562 A1 | 7/2001 | Rogers et al. |
| 2002/0016539 A1 | 2/2002 | Michaelis et al. |
| 2002/0041702 A1 | 4/2002 | Takeo et al. |
| 2003/0007598 A1 | 1/2003 | Wang et al. |
| 2004/0073107 A1 | 4/2004 | Sioshansi et al. |
| 2004/0161141 A1 | 8/2004 | Dewaele |
| 2005/0008211 A1 | 1/2005 | Xu et al. |
| 2005/0010106 A1 | 1/2005 | Lang et al. |
| 2005/0212810 A1 | 9/2005 | Drory et al. |
| 2006/0083418 A1 | 4/2006 | Watson et al. |
| 2006/0171573 A1 | 8/2006 | Rogers |
| 2006/0177125 A1 | 8/2006 | Chan et al. |
| 2006/0197763 A1 | 9/2006 | Harrison et al. |
| 2006/0239541 A1 | 10/2006 | Florin et al. |
| 2006/0285751 A1 | 12/2006 | Wu et al. |
| 2007/0005356 A1 | 1/2007 | Perronnin |
| 2007/0019852 A1 | 1/2007 | Schildkraut et al. |
| 2007/0092864 A1 | 4/2007 | Reinhardt et al. |
| 2007/0237401 A1 | 10/2007 | Coath et al. |
| 2007/0258648 A1 | 11/2007 | Perronnin |
| 2008/0002873 A1 | 1/2008 | Reeves et al. |
| 2008/0037852 A1 | 2/2008 | Zhou et al. |
| 2008/0037853 A1 | 2/2008 | Bernard et al. |
| 2008/0069425 A1 | 3/2008 | Liu et al. |
| 2008/0069456 A1 | 3/2008 | Perronnin |
| 2008/0292194 A1 | 11/2008 | Schmidt et al. |
| 2008/0298666 A1 | 12/2008 | Mysore Siddu et al. |
| 2008/0317322 A1 | 12/2008 | Acharyya et al. |
| 2009/0052756 A1 | 2/2009 | Saddi et al. |
| 2009/0052763 A1 | 2/2009 | Acharyya et al. |
| 2009/0060297 A1 | 3/2009 | Penn et al. |
| 2009/0097730 A1 | 4/2009 | Kasai et al. |
| 2009/0116716 A1 | 5/2009 | Zhou |
| 2009/0129657 A1 | 5/2009 | Huo et al. |
| 2009/0169113 A1 | 7/2009 | Geiger |
| 2009/0171236 A1 | 7/2009 | Davies |
| 2009/0180674 A1 | 7/2009 | Chen et al. |
| 2009/0214099 A1 | 8/2009 | Merlet |
| 2010/0002929 A1 | 1/2010 | Sammak et al. |
| 2010/0008424 A1 | 1/2010 | Pace |
| 2010/0054563 A1 | 3/2010 | Mendonca et al. |
| 2010/0098343 A1 | 4/2010 | Perronnin et al. |
| 2010/0104148 A1 | 4/2010 | Bovik et al. |
| 2011/0274327 A1 | 11/2011 | Wehnes et al. |
| 2011/0280465 A1 | 11/2011 | Wehnes et al. |
| 2012/0294502 A1 | 11/2012 | Chan et al. |

FOREIGN PATENT DOCUMENTS

| | | |
|---|---|---|
| WO | WO 2011/137410 | 11/2011 |
| WO | WO 2011/137411 | 11/2011 |
| WO | WO 2012/006318 | 1/2012 |

OTHER PUBLICATIONS

"CheckMate™ Ultra with PeerView™ Feature," Product Brochure, R2 Technology, Inc., circa 2002.
"The ImageChecker® Technology," Patient Pamphlet, R2 Technology, Inc., circa 2002.
"ImageChecker™ CT: Server DICOM Conformance Statement," PN 390-00-448 Rev. C, R2 Technology, Inc., Sep. 2003.
"ImageChecker™ CT: Workstation DICOM Conformance Statement," PN 390-00-449 Rev. D, R2 Technology, Inc., Sep. 2003.
"Improving Sensitivity and Efficiency in Lung CT Nodule Detection," ImageChecker® CT LN-1000, Product Brochure, R2 Technology, Inc., circa 2003.
"Improving Sensitivity and Efficiency in Lung CT Nodule Detection," ImageChecker® CT, Product Brochure, R2 Technology, Inc., circa 2003.
"Integrated Tools for Streamlined Review of MDCT Lung Exams," ImageChecker® CT LN-500, Product Brochure, R2 Technology, Inc., circa 2003.
"OmniCad," Product Brochure, R2 Technology, Inc., Oct. 16, 2003.
"R2 Algorithm: The Intuitive Choice," Product Brochure, R2 Technology, Inc., 2003.
"The Total CAD Solution for Film and Digital Mammography," ImageChecker® DM, Product Brochure, R2 Technology, Inc., 2003.
"CheckMate™ Ultra with PeerView™," Webpage, http://www.r2tech.com/prd/prd005.html, R2 Technology, Inc., 2004, downloaded Jan. 16, 2004.
"Technical Specifications Sheet for the ImageChecker® Display Units," R2 Technology, Inc., 2004.

(56) References Cited

OTHER PUBLICATIONS

"Technical Specifications Sheet for the ImageChecker® Processing Units," R2 Technology, Inc., 2004.

R2 Technology, Inc. Products Overview Webpage, http://www.r2tech.com/prd/index.html, downloaded Jan. 16, 2004, 1 page.

Van Wijk, C. et al., "Detection and Segmentation of Colonic Polyps on Implicit Isosurfaces by Second Principal Curvature Flow," IEEE Transactions on Medical Imaging, vol. 29, No. 3, Mar. 2010, pp. 688-698.

PCT International Search Report for International Application No. PCT/US2011/034699, mailed Jul. 18, 2011, 2 pages.

PCT International Preliminary Report on Patentability for International Application No. PCT/US2011/034699, mailed Nov. 6, 2012, 5 pages.

PCT International Written Opinion for International Application No. PCT/US2011/034699, mailed Jul. 18, 2011, 4 pages.

R2 Technology, Inc. ImageChecker® Product Webpage, archived at http://web.archive.org/web/20040422174630/http://www.r2tech.com/prd/prd002.html, archive date Apr. 22, 2004, downloaded Jan. 7, 2013, 2 pages.

R2 Technology, Inc. Algorithm Webpage, archived at http://web.archive.org/web/20040225065830/http://www.r2tech.com/prd/prd001.html, archive date Feb. 25, 2004, downloaded Jan. 7, 2013, 2 pages.

R2 Technology, Inc. Products Overview Webpage, archived at http://web.archive.org/web/20040216010921/http://www.r2tech.com/prd.index.html, archive date Feb. 16, 2004, downloaded Jan. 7, 2013, 5 pages.

Netsch, T., et al., "Scale-Space Signatures for the Detection of Clustered Microcalcifications in Digital Mammograms," IEEE Trans Med Imaging, Sep. 1999: 18(9): pp. 774-786.

* cited by examiner

SPICULATED MALIGNANT MASS DETECTION AND CLASSIFICATION IN RADIOGRAPHIC IMAGE

This application claims the benefit of U.S. Provisional Application Ser. No. 61/343,609, filed on May 2, 2010, U.S. Provisional Application Ser. No. 61/343,608, filed on May 2, 2010, U.S. Provisional Application Ser. No. 61/343,552, filed on May 2, 2010, U.S. Provisional Application Ser. No. 61/343,557, filed on Apr. 30, 2010, U.S. Provisional Application Ser. No. 61/395,029, filed on May 6, 2010, U.S. Provisional Application Ser. No. 61/398,571, filed on Jun. 25, 2010, U.S. Provisional Application Ser. No. 61/399,094, filed on Jul. 7, 2010, and U.S. Provisional Application Ser. No. 61/400,573, filed on Jul. 28, 2010, all of which applications are hereby incorporated herein by reference.

TECHNICAL FIELD

The present disclosure relates generally to computer-aided detection of malignant mass signatures in radiographic images, and more particularly to a system for locating masses and determining mass features that allow malignant masses containing surrounding spiculation and other architectural distortions to be identified.

BACKGROUND

Radiologists use radiographic images such as mammograms to detect and pinpoint suspicious lesions in a patient as early as possible, e.g., before a disease is readily detectable by other, intrusive methods. As such, there is real benefit to the radiologist being able to locate, based on imagery, extremely faint lesions and precursors. Large masses of relatively dense tissue are one signature of concern. Although some masses can appear quite prominent in a radiographic image, various factors including occlusion/partial occlusion by other natural can help identify a suspicious mass, particularly when its central bulge is difficult to see, is a spiculation pattern surrounding the mass. The spiculation pattern can appear in a radiographic image as a pattern of tissue that appears "drawn in" toward a central point.

Computer-Aided Detection (CAD) algorithms have been developed to assist radiologists in locating potential lesions in a radiographic image. CAD algorithms operate within a computer on a digital representation of the mammogram set for a patient. The digital representation can be the original or processed sensor data, when the mammograms are captured by a digital sensor, or a scanned version of a traditional film-based mammogram set. An "image," as used herein, is assumed to be at least two-dimensional data in a suitable digital representation for presentation to CAD algorithms, without distinction to the capture mechanism originally used to capture patient information. The CAD algorithms search the image for objects matching a signature of interest, and alert the radiologist when a signature of interest is found.

Classification of anomalies may be performed using a probability density function (PDF) that describes the relative likelihood of observing any given sample value of a random variable. The integral of a PDF over all possible values is 1; the integral of a PDF over a subset of the random variable's range expresses the probability that a drawn sample of a random variable will fall within that range.

PDFs that can be expressed by a closed-form equation are generally well understood, and many applications for such PDFs have been developed. On the other hand, the practical estimation of a PDF for a complex multidimensional random variable, particularly one with an unknown and possibly irregular distribution in each dimension, and/or long, sparsely populated tails, has in large part eluded researchers. In the area of pattern and image recognition, for instance, many researchers have abandoned PDF approaches and concentrated on known solvable alternatives, such as Neural Networks and linear discriminant functions, due to the practical difficulties in applying a PDF approach.

BRIEF DESCRIPTION OF THE DRAWINGS

The following is a brief description of the drawings, which illustrate exemplary embodiments of the present invention and in which.

DETAILED DESCRIPTION OF ILLUSTRATIVE EMBODIMENTS

Figure 1:
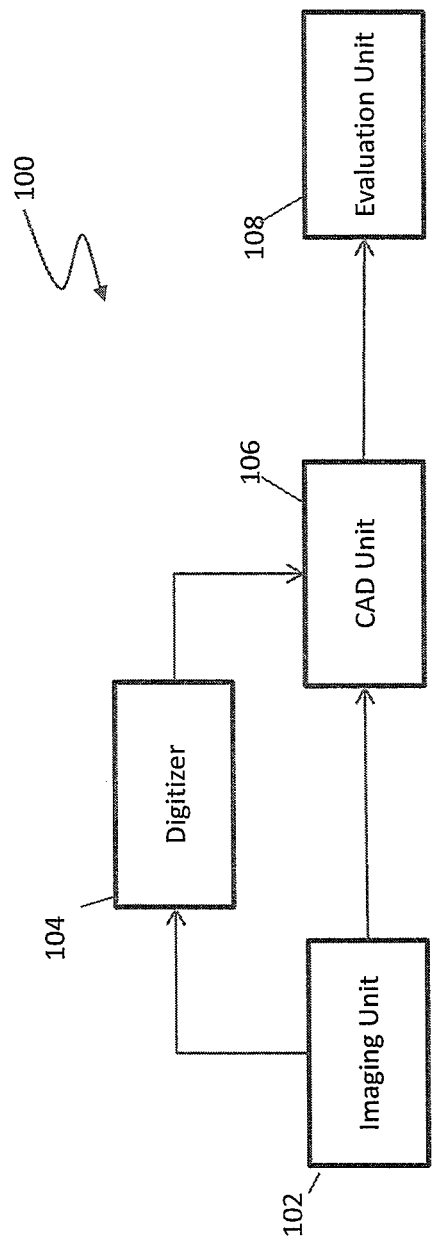
FIG. 1 is a system-level diagram for an anomaly detection system in accordance with an embodiment.

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For example, embodiments discussed herein are generally described in terms of assisting medical personnel in the examination of breast x-ray images, such as those that may be obtained in the course of performing a mammogram. Other embodiments, however, may be used for other situations, including, for example, detecting anomalies in other tissues such as lung tissue, any type of image analysis for statistical anomalies, and the like.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Referring first to FIG. 1, a system 100 for assisting in detecting anomalies during, for example, mammograms, is illustrated in accordance with an embodiment. The system 100 includes an imaging unit 102, a digitizer 104, and a Computer-Aided Detection (CAD) unit 106. The imaging unit 102 captures one or more images, such as x-ray images, of the area of interest, such as the breast tissue. In the embodiment in which the system 100 is used to assist in analyzing a mammogram, a series of four x-ray images may be taken while the breast is compressed to spread the breast tissue, thereby aiding in the detection of anomalies. The series of four x-ray images include a top-down image, referred to as a cranio caudal (CC) image, for each of the right and left breasts, and an oblique angled image taken from the top of the sternum angled downwards toward the outside of the body, referred to as the medio lateral oblique (MLO) image, for each of the right and left breasts.

The one or more images may be embodied on film or digitized. Historically the one or more images are embodied as x-ray images on film, but current technology allows for x-ray images to be captured directly as digital images in much the same way as modern digital cameras. As illustrated in FIG. 1, a digitizer 104 allows for digitization of film images into a digital format. The digital images may be formatted in any suitable format, such as industry standard Digital Imaging and Communications in Medicine (DICOM) format.

The digitized images, e.g., the digitized film images or images captured directly as digital images, are provided to a Computer-Aided Detection (CAD) unit 106. As discussed in greater detail below, the CAD unit 106 processes the one or more images to detect possible locations of various types of anomalies, such as calcifications, relatively dense regions, distortions, and/or the like. Once processed, locations of the possible anomalies, and optionally the digitized images, are provided to an evaluation unit 108 for viewing by a radiologist, the attending doctor, or other personnel, with or without markings indicating positions of any detected possible anomalies. The evaluation unit 108 may comprise a display, a workstation, portable device, and/or the like.

Figure 2:
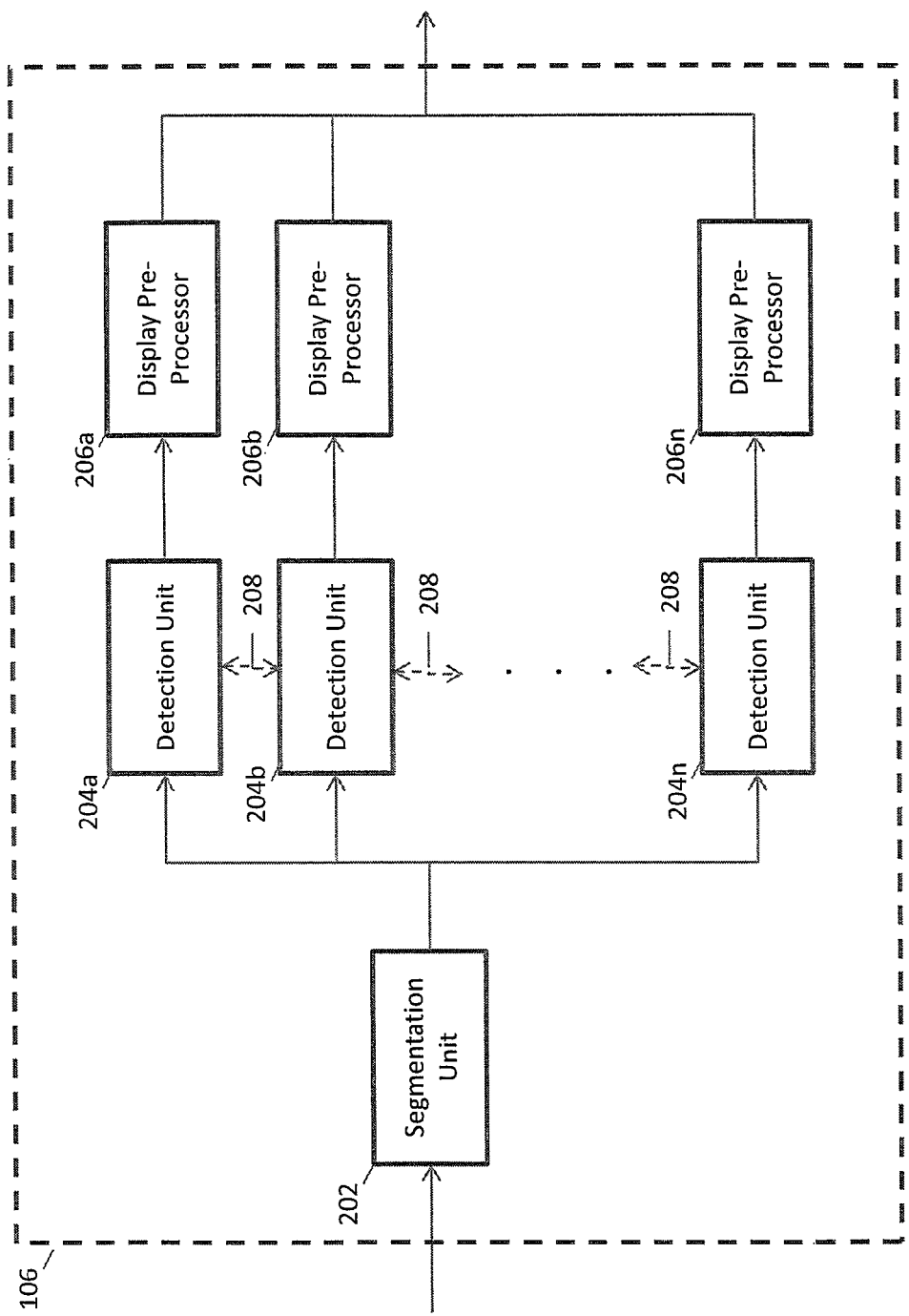
FIG. 2 is a component diagram of a Computer-Aided Detection (CAD) unit in accordance with an embodiment.

FIG. 2 illustrates components that may be utilized by the CAD unit 106 (see FIG. 1) in accordance with an embodiment. Generally, the CAD unit 106 includes a segmentation unit 202, one or more detection units 204a-204n, and one or more display pre-processors 206a-206n. As will be appreciated, an x-ray image, or other image, may include regions other than those regions of interest. For example, an x-ray image of a breast may include background regions as well as other structural regions such as the pectoral muscle. In these situations, it may be desirable to segment the x-ray image to define a search area, e.g., a bounded region defining the breast tissue, on which the one or more detection units 204a-204n is to analyze for anomalies.

The one or more detection units 204a-204c analyze the one or more images, or specific regions as defined by the segmentation unit 202, to detect specific types of features that may indicate one or more specific types of anomalies in the patient. For example, in an embodiment for use in examining human breast tissue, the detection units 204a-204n may comprise a calcification unit, a density (mass) unit, and a distortion unit. As is known in the medical field, the human body often reacts to cancerous cells by surrounding the cancerous cells with calcium, creating micro-calcifications. These micro-calcifications may appear as small, bright regions in the x-ray image. The calcification unit detects and identifies these regions of the breast as possible micro-calcifications.

It is further known that cancerous regions tend to be denser than surrounding tissue, so a region appearing as a generally brighter region indicating denser tissue than the surrounding tissue may indicate a cancerous region. Accordingly, the density unit analyzes the one or more breast x-ray images to detect relatively dense regions in the one or more images. Because the random overlap of normal breast tissue may sometimes appear suspicious, in some embodiments the density unit may correlate different views of an object, e.g., a breast, to determine if the dense region is present in other corresponding views. If the dense region appears in multiple views, then there is a higher likelihood that the region is truly malignant.

The distortion unit detects structural defects resulting from cancerous cells effect on the surrounding tissue. Cancerous cells frequently have the effect of "pulling in" surrounding tissue, resulting in spiculations that appear as a stretch mark, star pattern, or other linear line patterns.

It should be noted that the above examples of the detection units 204a-204n, e.g., the calcification unit, the density unit, and the distortion unit, are provided for illustrative purposes only and that other embodiments may include more or fewer detection units. It should also be noted that some detection units may interact with other detection units, as indicated by the dotted line 208. The detection units 204a-204n are discussed in greater detail below with reference to FIG. 3.

The display pre-processors 206a-206n create image data to indicate the location and/or the type of anomaly. For example, micro-calcifications may be indicated by a line encircling the area of concern by one type of line (e.g., solid lines), while spiculations (or other type of anomaly) may be indicated by a line encircling the area of concern by another type of line (e.g., dashed lines).

Figure 3:
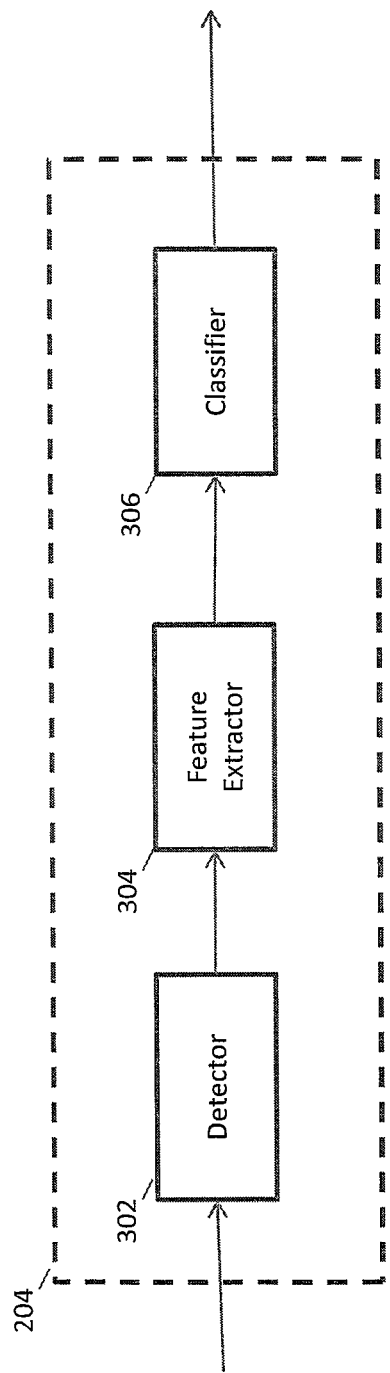
FIG. 3 is a component diagram of a detection unit in accordance with an embodiment.

FIG. 3 illustrates components of that may be utilized for each of the detection units 204a-204n in accordance with an embodiment. Generally, each of the detection units 204a-204n may include a detector 302, a feature extractor 304, and a classifier 306. The detector 302 analyzes the image to identify attributes indicative of the type of anomaly that the detection unit is designed to detect, such as calcifications, and the feature extractor 304 extracts predetermined features of each detected region. For example, the predetermined features may include the size, the signal-to-noise ratio, location, and the like.

The classifier 306 examines each extracted feature from the feature extractor 304 and determines a probability that the extracted feature is an abnormality. Once the probability is determined, the probability is compared to a threshold to determine whether or not a detected region is to be reported as a possible area of concern.

A suitable segmentation unit 202 is specified in U.S. Provisional Application Ser. Nos. 61/400,573 and 61/398,571, suitable detection units for use in detecting and classifying microcalcifications are specified in U.S. Provisional Application Ser. Nos. 61/343,557 and 61/343,609 and co-filed U.S. PCT patent application Ser. No. PCT/US11/34696, a suitable detection unit for detecting and classifying malignant masses is specified in U.S. Provisional Application Ser. No. 61/343,552 and co-filed U.S. PCT patent application Ser. No. PCT/US11/34698, a suitable probability density function estimator is specified in U.S. Provisional Application Ser. No. 61/343,608 and co-filed U.S. PCT patent application Ser. No. PCT/US11/34700, and suitable display pre-processors are specified in U.S. Provisional Application Ser. Nos. 61/399,094, all of which are incorporated herein by reference.

Figure 4:
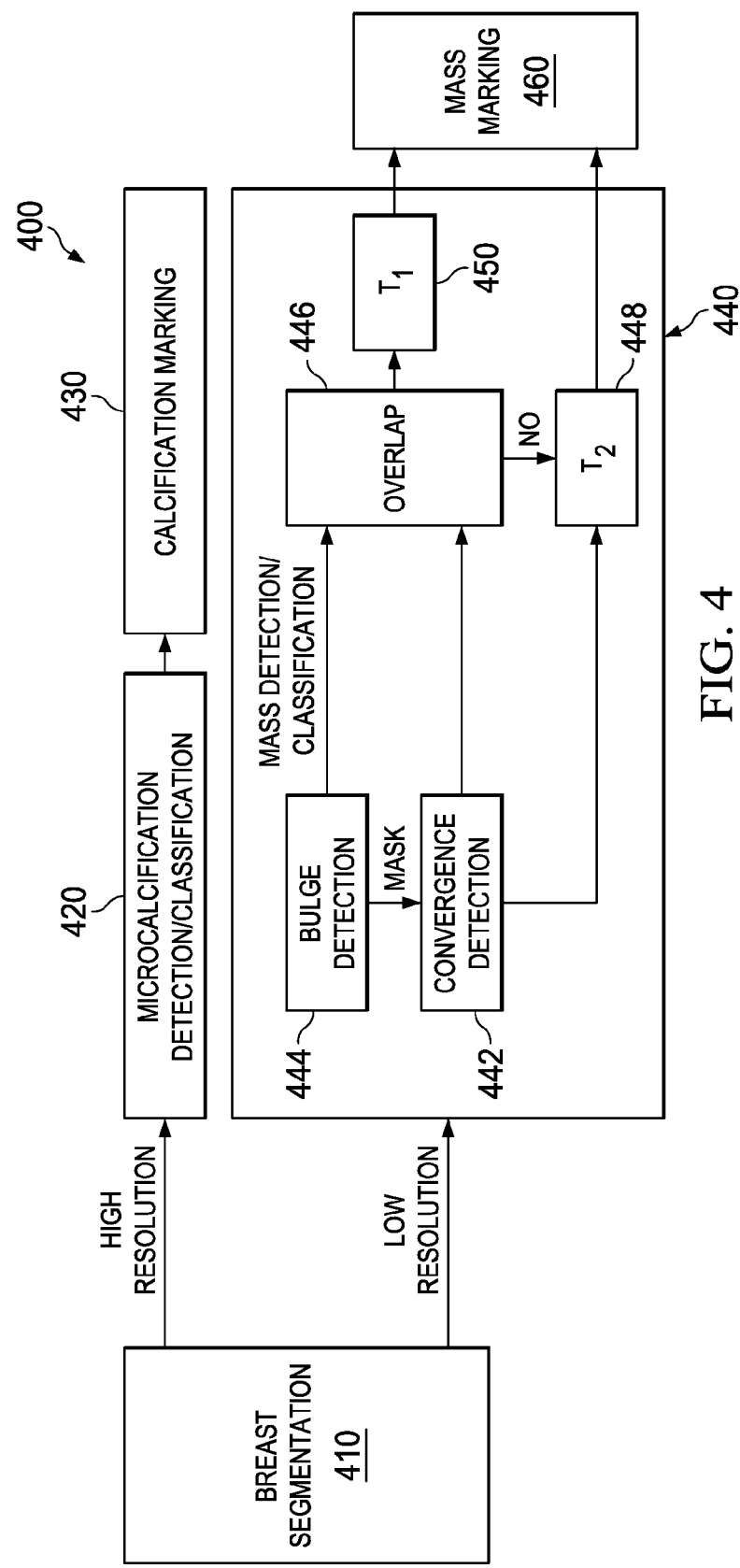
FIG. 4 contains a system block diagram for an overall Computer-Aided Detection process according to an embodiment.

The following paragraphs provide greater details regarding a malignant mass detection unit, such as may be utilized as one or more of the detection units 204a-204n (see FIG. 2) in accordance with an embodiment. In particular, the embodiments described below seek to detect and classify potentially malignant masses in a radiographic image. FIG. 4 contains an overall system block diagram 400 for a detection/classification process according to an embodiment useful with mammography imaging systems.

A breast segmentation process 410 attempts to distinguish breast tissue from non-breast tissue areas of a mammogram. Breast segmentation 410 passes a breast mask image and a high-resolution version of the radiographic image to a microcalcification detection/classification stage 420, which seeks to find clusters of microcalcifications indicative of malignancy. When such clusters are found, descriptions for their location and extent are passed to calcification marking 430, which merges overlapping clusters as appropriate, and generates marks as needed for CAD result printouts, storage, display to a radiologist on an overlay of the displayed mammogram, etc.

Breast segmentation 410 also passes the breast mask image and a low-resolution version of the radiographic image to a mass detection/classification stage 440. A bulge detection unit 444 searches the lower resolution image for extended mass-like features at various scales. The locations of bulges detected at any of the scales are passed as a mask to a convergence detection unit 442. Convergence detection unit 442 searches the lower resolution image for converging image features indicative of spiculated masses, at the locations of bulges indicated by the bulge detection unit.

Mass detection/classification stage 440 performs classification on the most significant bulges and convergences located in the image. An overlap mapper 446 determines whether each significant bulge and convergence pair overlap to an extent that the hub of the convergence appears to be co-located with the bulge, in which case an additional joint classification is made for the combined bulge/convergence. Overlap detector 446 passes each bulge or bulge/convergence pair, along with its probability of malignancy, to a probability threshold detector 450, and passes each convergence that does not overlap one of the bulges to a probability threshold detector 448. The different threshold detectors allow, e.g., a convergence that is not confirmed by a significant co-located bulge to be deemed suspicious at a higher threshold than other mass detections. Threshold detectors 448 and 450 pass the locations and extent of suspicious masses to a mass marking stage 460. Mass marking stage 460 merges overlapping clusters as appropriate, and generates marks as needed for CAD result printouts, storage, display to a radiologist on an overlay of the displayed mammogram, etc.

Figure 5:
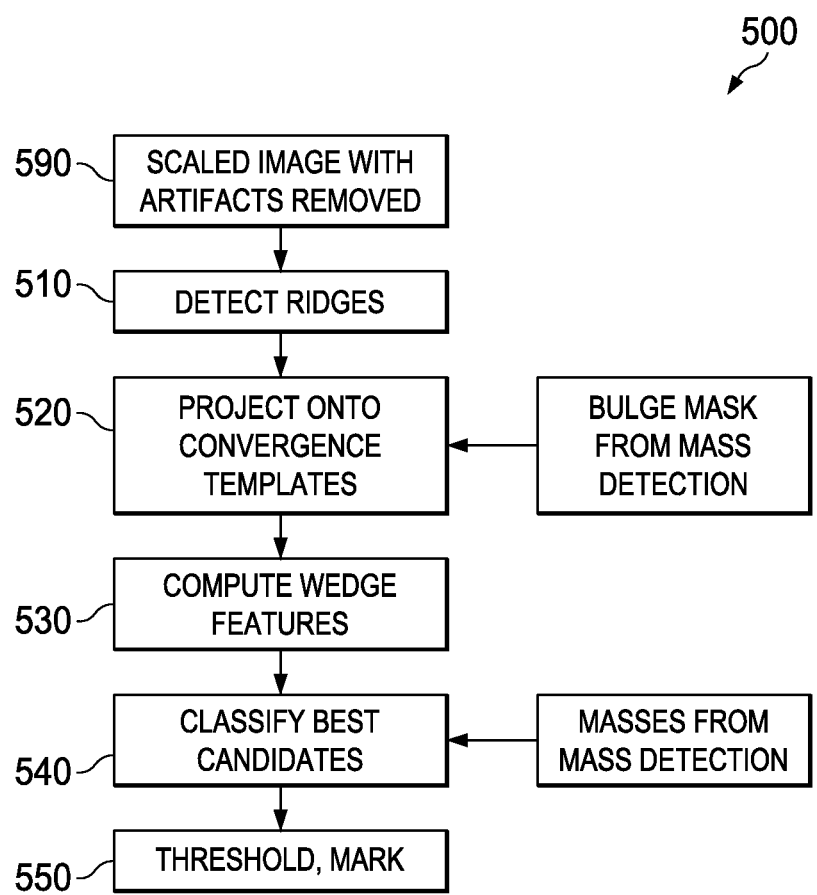
FIG. 5 contains a flowchart for a spiculated lesion detection and classification process according to an embodiment.

FIG. 5 contains a flowchart 500 for the high-level operations performed by convergence detection unit 442, as well as the overlap and thresholding units of mass detection/classification stage 440. Preferably, an image input to the convergence detection unit is preprocessed to an appropriate scale, e.g., 100-micron pixel size in one embodiment, as well as processed to remove artifacts. These artifacts can include bright areas representing strong edges (typically imager artifacts), bright lines such as skin folds, and large bright areas are removed from the image. Such areas are readily recognizable by strong second derivative outliers, with confirmation features such as linearity, orientation, or a "V" shape in the case of a skin fold, aiding recognition. The system marks, on a valid pixel image, pixels belonging to these types of signatures as invalid. Once marked as invalid, such pixels are not used in convergence detection to prevent their extremely strong signatures from masking nearby weak signatures of interest.

Figure 5A:
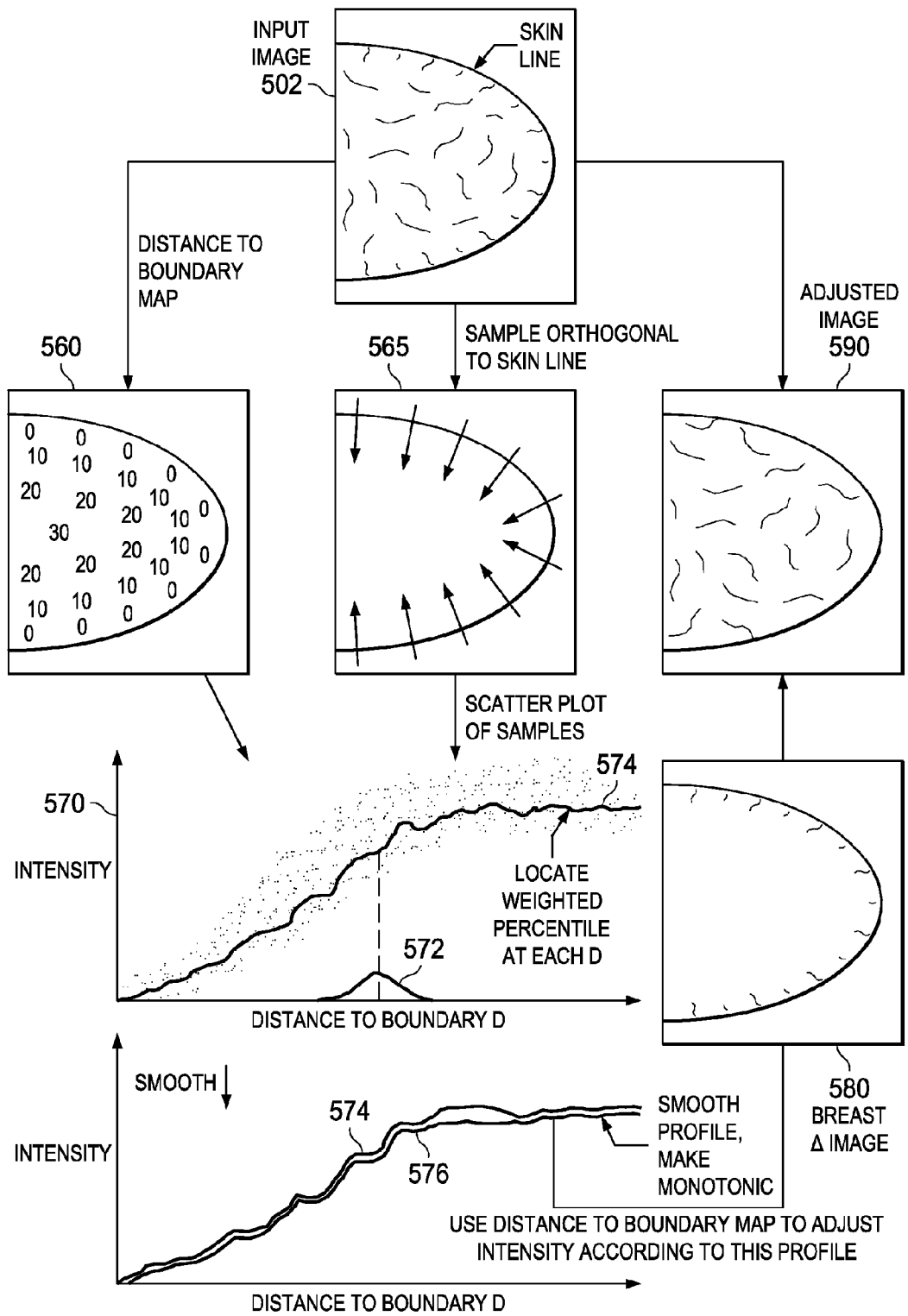
FIG. 5A illustrates an intensity compensation preprocessing procedure useful with an embodiment.

An optional scaling step is an intensity-flattening step for the breast tissue area. This step estimates a compensation for the decrease in tissue thickness near the skin line, which results in additional image exposure and density near the breast boundary. FIG. 5A illustrates details in the intensity-flattening process.

The skin line is used as a starting point to create a distance-to-boundary map 560 of the breast tissue. Pixels along the skin line are assigned a zero distance in the map 560, pixels that are a valid part of the breast and touching the zero-distance pixels are assigned a unit distance, pixels touching the unit-distance pixels are assigned a two-unit distance, and so forth, with the process continuing until all valid pixels are assigned a distance (optionally, the process can be stopped early at some fixed distance beyond which a high confidence exists that imaged thickness remains constant).

The image intensity is sampled along a large number of lines orthogonal to the skin line, all along the skin line, as shown in process 565. As intensity samples are collected along each line, the samples are collected in data structure groups according to the skin line distance written in map 560. Although the system embodiment does not actually create a scatter plot, scatter plot 570 illustrates, intuitively, a typical distribution of intensity versus boundary distance, D. At any distance D, individual pixel intensity varies according to the structure crossed in each sample line, with a general underlying trend representing an "undersignal." The undersignal represents the x-ray absorption expected for minimally dense tissue of a thickness found a given distance from the skin line. It is this undersignal that is estimated and removed.

One approach can define the minimum pixel intensity at each distance D as the undersignal at that distance. Due to noise, uncertainty in skin line determination, variations along the breast contour in how quickly the thickness tapers toward the skin line, etc., this approach can lack robustness (although it may work well with some digital imagery). An alternate embodiment sorts the samples into ascending order for each D, and weights samples at distances close to D according to a weighting function 572. The undersignal point is selected at the intensity that is above a given percentage P of the weighted pixels (at D and surrounding distances), with values of P of about 30% exhibiting good performance.

The calculated undersignal may not monotonically increase with increasing D, even though the actual undersignal would be expected to increase monotonically. A smoothing step forces monotonicity upon the undersignal 574, by starting at the largest D modeled and moving toward 0. At each point D, a smoothed undersignal 576 adopts the same value as undersignal 574, unless undersignal 574 increases.

When undersignal 574 increases, smoothed undersignal 576 remains constant until D decreases to a point that undersignal 574 drops to at least the value of smoothed undersignal 576. At this point, smoothed undersignal 576 will continue to track undersignal 574 again until the next upwards excursion of undersignal 574.

Once the smoothed undersignal 576 is complete, it is combined with distance-to-boundary map 560 to create a breast Δ image 580 that describes an intensity that is to be subtracted from that image pixel to remove the undersignal. The final, adjusted image 590 is created by subtracting the breast Δ image 580 from the input image 502.

Referring again to FIG. 5, adjusted image 590 is passed to convergence detection 500, which begins at step 510. Ridge detection 510 attempts to find ridges in the image, e.g., elongated quasi-linear structures, at various scales, aspect ratios, and orientations. Convergence projection 520 transforms the ridge data onto a set of projection maps, which describe how well each ridge aligns with a direction specified for each map. Wedge feature computation 530 rapidly considers a large number of possible convergence patterns for each possible convergence location, calculating features for each and storing features for the best matches. Classification step 540 and threshold, marking step 550 use the features found for each potential convergence to locate suspicious regions and mark them.

Figure 6:
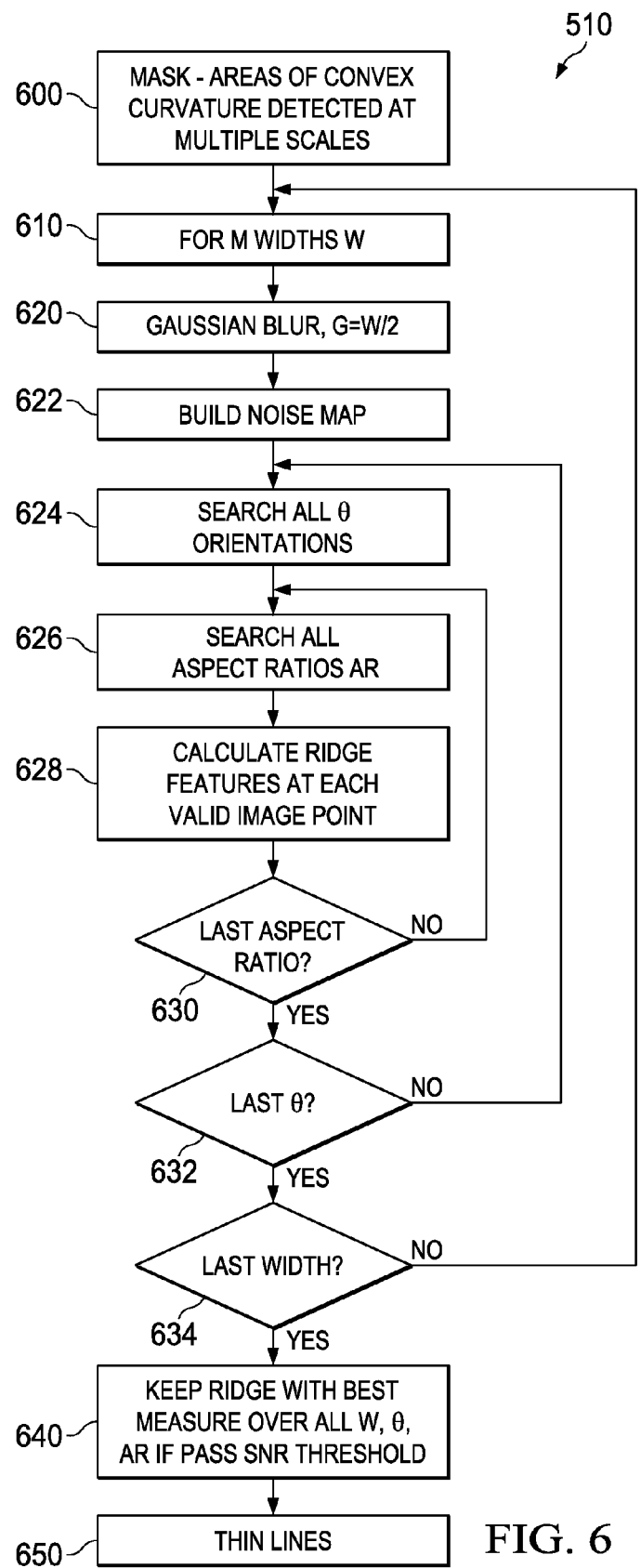
FIG. 6 contains a flowchart for a ridge detection process according to an embodiment.

FIG. 6 contains a flowchart for one embodiment 510 useful for locating ridges on the scaled input image. A first step, 600, is performed on an intermediate output of bulge detection 444 (FIG. 4). Bulge detection attempts to find bulges at M scales, e.g., from 4 mm to 50 mm, with each scale spaced from its neighbors by a multiplicative scale factor {fourth root}$\sqrt{2}$.

At each scale, significantly finer structure than the mass of interest is not desired for detection. Accordingly, the adjusted image 590 is subsampled by an integer factor related to the scale, and then smoothed with a Gaussian function related to the subsample factor.

Once the subsampled image is smoothed, second derivative (D2) measurements are taken at multiple orientations at each valid point, using points spaced W/3 apart (where W is the current scale) to estimate curvature along an orientation. At each valid pixel, if the minimum negative second derivative (Min ND2) measurement for all orientations is negative, this signifies that the D2 measurement at all orientations indicated a convex down curvature. Areas of 8-neighbor connected convex down curvature are joined, with each such area identifying a raw potential mass location. The raw potential mass locations found at each scale are ORed (scaled to the same scale for the OR operation) to create a mask of potential convergence "hubs" to be considered for spiculation centers.

Ridge detection process 510 searches the scaled, adjusted input image 590 for ridges present at M different widths, calculated at block 610. In one embodiment, the smallest ridge width (peak-to-valley) searched for is 200 microns wide. Additional searches are carried out at larger ridge widths, in one embodiment spaced at three widths/octave (200, 250, 320, 400, 500, etc.) up to the largest ridge width desired.

For a given width W, a step 620 blurs the image, e.g., using a Gaussian function with σ=W/2. The blurring process filters noise and attenuates smaller image structure that interferes with detection of ridges of the current width.

Figure 7:
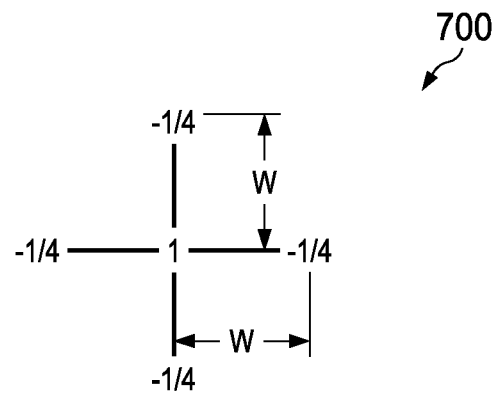
FIG. 7 depicts a noise estimation operator useful in an embodiment.

Step 622 determines the "noise" curvature present in the image at the present scale. In one embodiment, the second derivative operator 700 shown in FIG. 7 is applied to the blurred image. Statistics such as the median output over a region local to each valid pixel, or a median output over the entire image, form a noise figure for use in feature calculation.

Block 624 calculates a current orientation θ for a ridge measurement. At each loop, block 624 finds the next orientation θ for consideration. In one embodiment, 16 orientations evenly spaced over a half-circle are considered.

Block 626 calculates a current aspect ratio AR for a ridge measurement. In one embodiment, the aspect ratio AR is defined as the number of second derivative (D2) measurement points in the current measurement. In one embodiment, aspect ratios of 3, 5, and 7 points are considered. Longer aspect ratios can be used as well.

Figure 8:
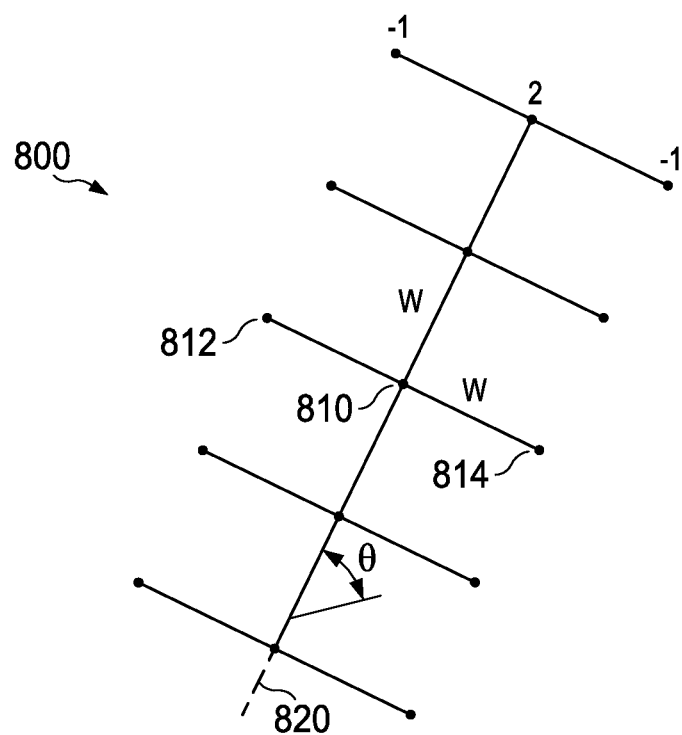
FIG. 8 depicts a ridge detection operator useful in an embodiment.

Block 628 calculates ridge features at each valid image point, for the current values of W, θ, and AR. FIG. 8 shows one embodiment of a ridge operator 800, rotated to an angle θ and at an aspect ratio of 5. Five second derivative operators (equal to the aspect ratio) are spaced, along a line 820 oriented at θ, at −2W, −W, 0, W, and 2W microns (interpolated if necessary to subpixel space) from the current pixel location 810. Each second derivative operator considers a center pixel on line 820 (e.g., pixel 810) and two pixels spaced W and −W microns measured orthogonal to line 820, on a line passing through the center pixel. A second derivative operator (−1,2,−1) weights pixels 812, 810, 814, respectively, for the center measurement; the other four second derivative measurements use the same operator.

At each pixel, W, θ, and AR combination, block 628 calculates several features. The individual second derivative measurements are combined to calculate an average contrast and a contrast standard deviation. Contrast density is defined as the average contrast divided by the width W. Signal-to-noise ratio SNR is defined as the average contrast divided by the noise from the noise map and a normalization factor for the current AR.

Ridge detector 510 loops through decision blocks 630, 632, and 634 until all combinations of W, θ, and AR have been exhausted, and then branches to a pruning block 640. Pruning block 640 examines each measurement for a given pixel, and keeps the one with the best SNR. In one embodiment, however, a measure with a strong SNR can be rejected if its normalized contrast variance is too small, as this is unlikely to represent normal structure. Also, best ridge values with a low SNR likely indicate the lack of a ridge at that location, and are also removed at this point.

After block 640 selects the best ridge candidates, block 650 thins lines. For instance, as a wide ridge operator sweeps across a real line signal side to side, it will likely sense the line as more than one pixel wide. Block 650 attempts to thin fattened line responses of neighboring pixels at the same W, θ, and AR back to a central ridge of strongest response.

Figure 9:
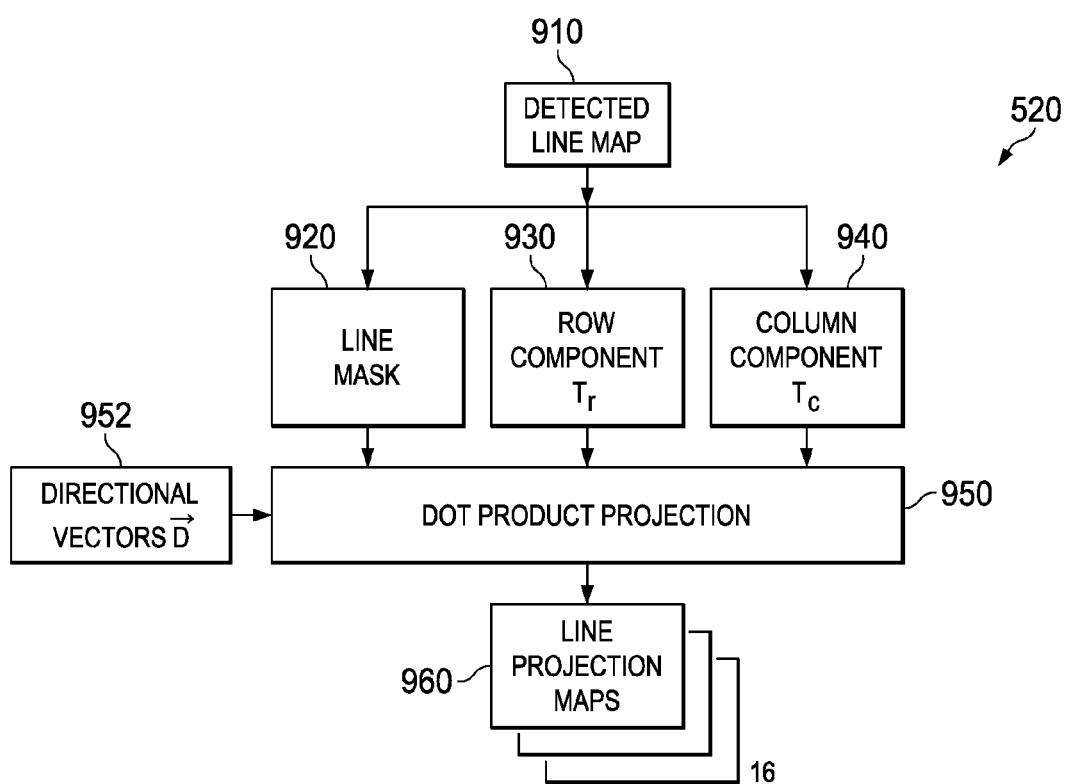
FIG. 9 illustrates a line projection mapping operation useful in an embodiment.

Referring back to FIG. 5, ridge detection 510 passes a detected line map (average contrast AC, θ) to projection block 520. FIG. 9 illustrates the function of the projection block. The detected line map 910 is separated into three images: a line mask image 920, with the mask values for valid ridge locations set to AC; a row component image $T_r=\cos(\theta)$ 930, and a column component image $T_c=\sin(\theta)$ 940.

For an actual spiculation, the measured "spokes" of the structure may not align straight toward the hub, or may be at an angle splitting the difference between two quantized values of θ. To allow a pattern match with some allowance for angular deviation or measurement error, a set of line projection maps 960 is calculated. Each projection map defines line contributions along one of N direction vectors $\vec{D}_k$ 952 evenly distributed across a half-circle. A dot product projection calculator 950 fills a given line projection map with a projection value for each valid image location (i,j) that expresses a strength along that direction:

$$p(i, j, k) = AC(i, j)e^{-\frac{(\vec{D}_k \vec{T}_{i,j})^2}{2}}.$$

Figure 10:
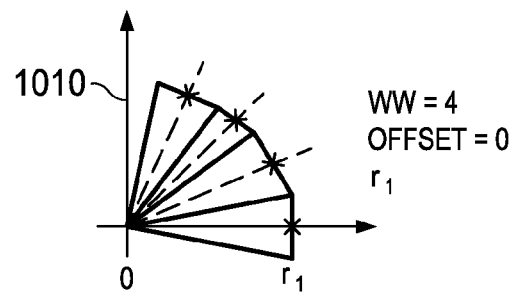
FIG. 10 illustrates several of the "wedge" patterns used to estimate spiculation in an embodiment.
Figure 10:
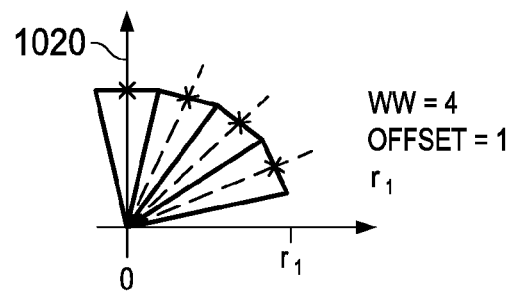
Figure 10:
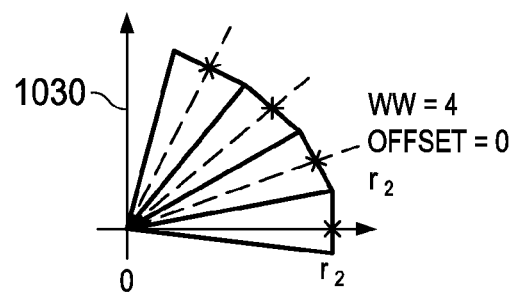
Figure 10:
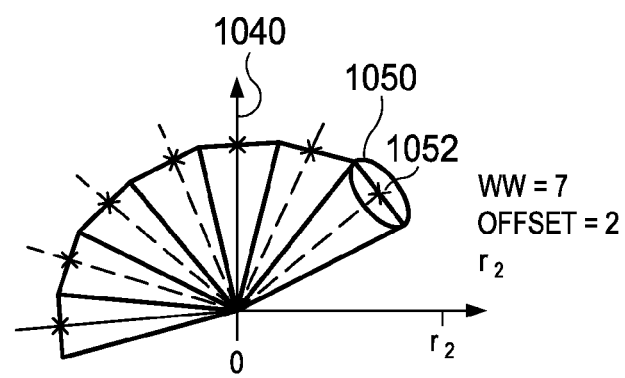

Wedge feature calculation 530 (FIG. 5) receives the line projection maps 960 from projection calculation 520. FIG. 10 contains examples of wedges, and FIG. 8 contains a flowchart with details of wedge feature calculation 530.

A wedge, for purposes of feature calculation, is an arc that has been quantized to a number of discrete positions at a given radius from a hub pixel of interest. Since different radii are searched for convergence, the fixed number of positions necessarily represents a larger area as the radius increases. Accordingly, the area considered for convergence by each position expands as a "wedge" away from the hub pixel.

Each wedge is defined by three parameters: a wedge width WW, the number of quantized segments used for the measurement; an offset O, expressing the number of quantized segments "skipped," e.g., measured counterclockwise from the x-axis in one embodiment, to reach the first segment included in the wedge; and the radius r. In FIG. 10, plot 1010 shows a wedge with WW=4, O=0, and r=$r_1$. Plot 1020 shows the same wedge as plot 1010, except rotated one position to offset O=1. Plot 1030 shows the same wedge as plot 1010, except with a larger radius r=$r_2$. Plot 1040 shows a wedge with WW=7, O=2, and r=$r_2$. With 16 segments available, each wedge width can be tested at 16 locations, except for WW=16, which uses all segments and thus cannot be rotated to any position giving a different measurement. Also, a minimum wedge width can be selected, below which a spiculation is unlikely.

Figure 11:
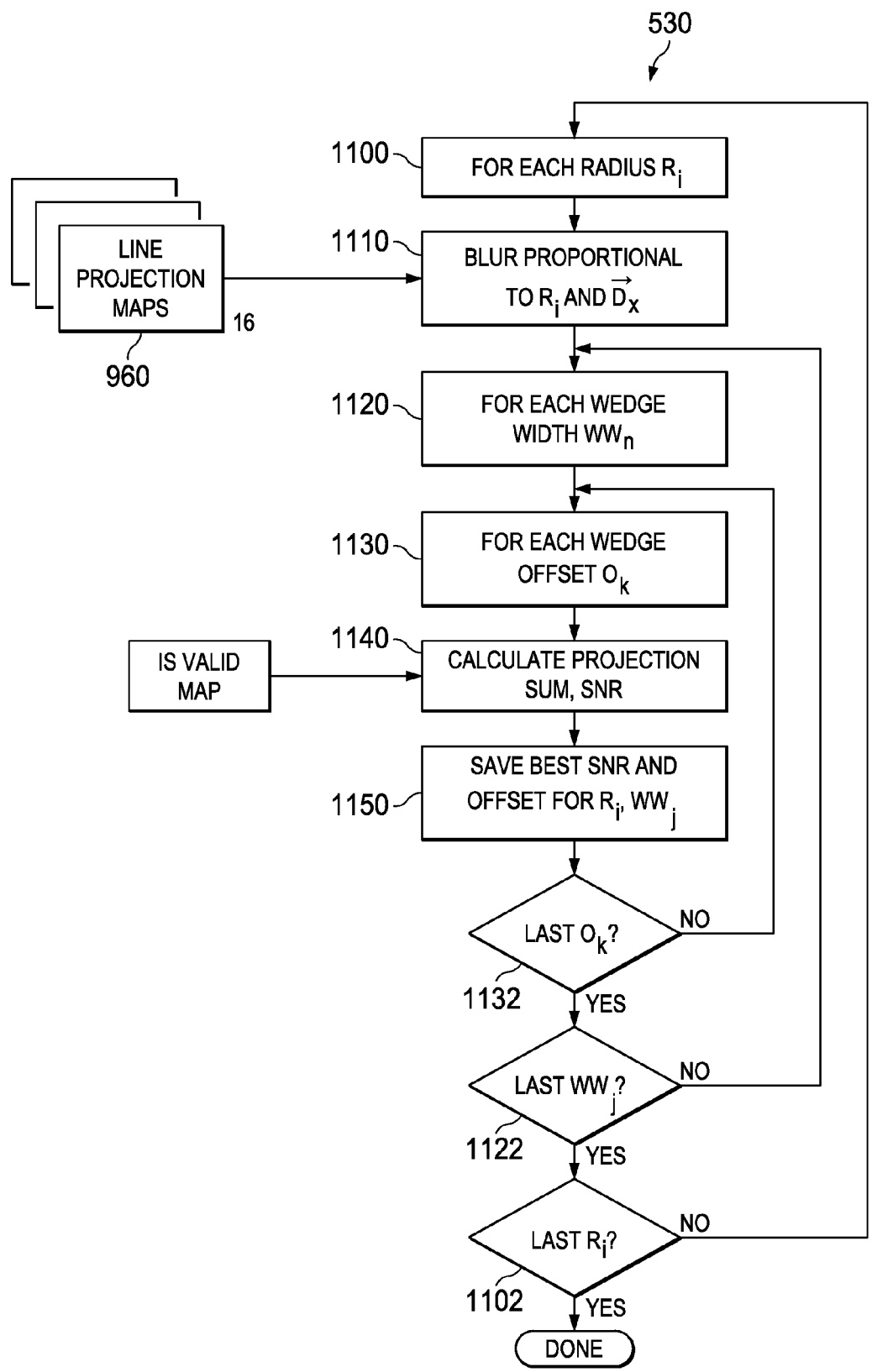
FIG. 11 contains a flowchart for calculating wedge pattern features according to an embodiment.

In one preferred embodiment shown in FIG. 11, significant computational efficiencies are gained by reducing a convergence score for a given wedge to a simple set of calculations. The process loops from a starting block 1100 on each radius $r_i$ that is to be searched for convergences. For a given radius, each line projection map p(i,j,k) from set 960 is blurred by block 1110 with a two-dimensional Gaussian blur function, with $\vec{\sigma}_{k,i} = Cr_i \vec{D}_k$. The constant C is selected so that blurring add contributions along the chord of a wedge at distance $r_i$ to the center measurement point for that wedge. For instance, in plot 1040, a blur area 1050 contributes to a value in the blurred image at location 1052.

Using the blurred projection maps for the current radius, two inner loops 1120 to 1122 and 1130 to 1132 are executed. One loop varies wedge width over the possible wedge widths; the other varies wedge offset over the possible offsets for the current wedge width.

Block 1140 calculates, for a given wedge width and offset, a convergence strength projection sproj value at each valid pixel location (i,j). The projection score sums ww measurements, by determining a radial measurement location (e.g., 1052) for each included wedge segment from the starting offset wedge segment, at distance $r_1$ from the current pixel location. For a given wedge segment, the measurement is an interpolated (if necessary) value from the blurred line projection map representing line strength along the radial direction of that wedge segment.

Each pixel containing a valid convergence strength projection sproj(i,j) for the current radius, wedge width, and offset is included in global calculations over all valid pixels for median projected strength smedian and projected strength standard deviation ssdev. A SNR value at each valid pixel is then calculated as $$SNR(i, j) = \frac{sproj(i, j) - smedian}{sdev}.$$

Block 1150 saves, for each pixel location, the best SNR and offset for each combination of wedge width and radius. In the inner loop over wedge offset, if the current SNR for a pixel is better than that already stored, the current SNR and its offset is saved. After all radii and wedge width combinations have been tried, the output is a series of maps, one per radius/wedge width combination, describing, for each pixel, the best SNR and offset found. Each map can be thresholded to a minimum significant SNR, and thinned such that contiguous groups of surviving convergence hubs are thinned to the member with maximum SNR.

For each surviving convergence hub, six classification features are calculated (or saved if already known). The features include wedge width, radius, SNR, minimum hub contrast, x position (e.g., nipple distance), and y position.

Figure 12:
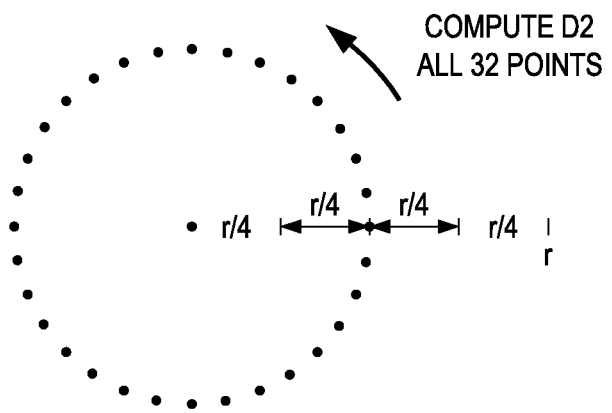
FIG. 12 illustrates a hub contrast detection mapping according to an embodiment.
Figure 13:
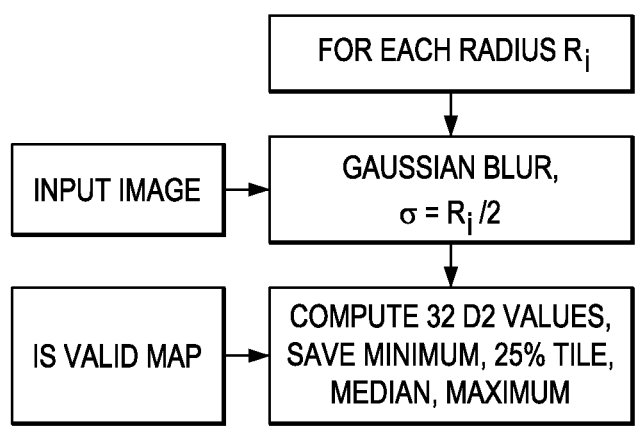
FIG. 13 contains a flowchart for calculating hub contrast scores according to an embodiment.

Minimum hub contrast is an expression of whether a mass appears at the hub of the convergence. In one embodiment, shown in FIGS. 12 and 13, minimum hub contrast is measured at half the radius of the convergence. The input image is blurred, e.g., with a Gaussian blur with s=r/2. For each hub convergence point saved for a given radius, starting from the center pixel, a D2 operator is stepped around the center pixel. The D2 operator measures curvature using three points spaced at r/4, r/2, and 3r/4 away from the center pixel. The minimum hub contrast feature is the minimum D2 value found among the measurements for a given hub position. It is considered a good measure because, by inference, all other contrast value orientations are greater. Other features, such as the 25 percentile contrast, median contrast, or maximum contrast, may be substituted or used to augment the feature set as well.

Figure 14:
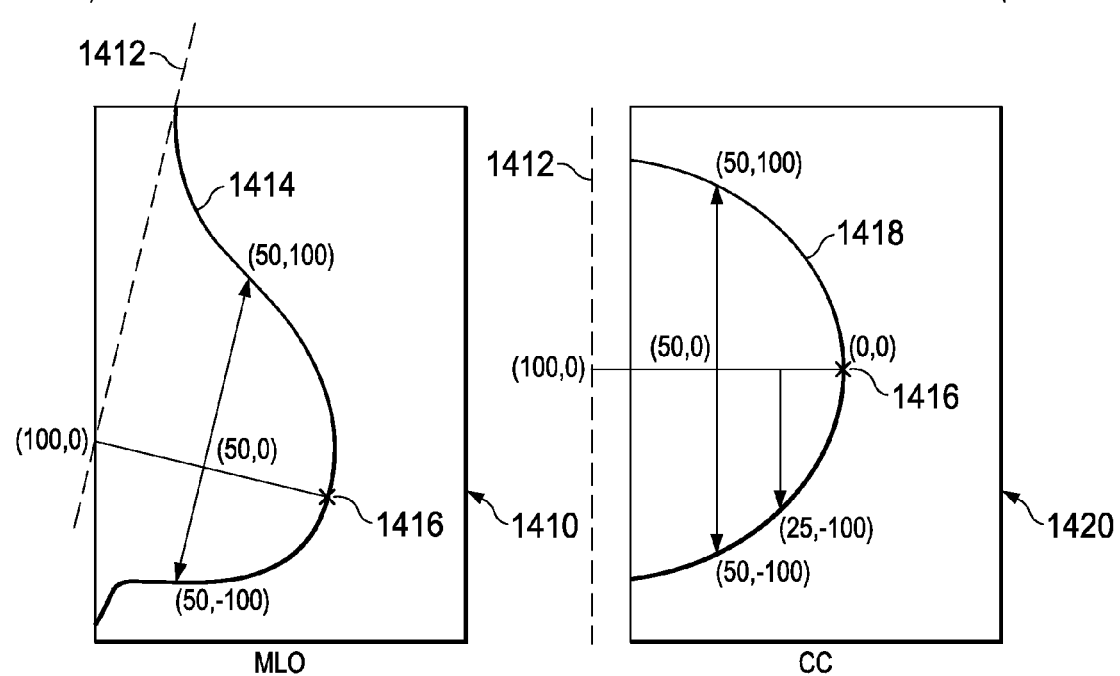
FIG. 14 illustrates a breast coordinate system used in the embodiments.

Nipple distance and y position describe the location of the object in the breast, in a novel breast coordinate system. The novel coordinate system allows mass location to form a meaningful and classifiable feature, despite the large variation in patient size, breast size, and breast shape. Typical radiological views for mammography include a mediolateral oblique view (MLO, shown as view 1410 in FIG. 14) and a cranio-caudal view (CC, shown as view 1420 in FIG. 14). Other, less-common views are also occasionally taken, and can be expressed in similar coordinate systems.

The MLO view is segmented to find the pectoral line 1412 and the skin line 1414. The nipple 1416 is defined in the coordinate system as the point on the skin line furthest from the pectoral line 1412, measured orthogonal to the pectoral line. The x-axis of the coordinate system is the line running from the nipple point 1416 to the pectoral line 1412, with the value 0 lying at the nipple point and the value 100 lying at the pectoral line. The pectoral line may not actually be visible in the image at the x-axis position, but is assumed to extend as far as needed below the visible portion to form the coordinate system. Thus the x-coordinate of any point in the breast is the percentage of the distance from the nipple (front) of the breast to the pectoral line (back) of the breast.

The y-coordinate in the breast coordinate system is also expressed on a 0 to 100 scale (points below the x-axis are expressed on a 0 to −100 scale). The scale changes, however, with x-value, as 100 or −100 is defined, for a given x-coordinate, as the point orthogonal to the x-axis at the x-value where the skin line is crossed. Since the cross-sectional profile of the breast generally expands as one traverses the image from the nipple point to the pectoral line, the scale units near the pectoral line are significantly larger than the scale units near the nipple point. The normalized scaling, however, allows statistical frequency of object occurrence as a function of breast position to be tabulated without regard to breast shape and size discrepancies. Several exemplary coordinates are shown on MLO view 1410.

For CC view 1420, the pectoral line is often not visible. The coordinate system for the CC view assumes that the pectoral line 1412 is perpendicular to the view edge, and therefore the nipple point 1416 is the point on skin line 1418 that is furthest from the image edge. The coordinate system also assumes that the pectoral line 1412 is located the same absolute distance from the nipple point as that measured in MLO view 1410. Assuming this x-axis definition, a similar x-axis-to-skin-line y-coordinate system as that used in the MLO view is adopted for the CC view. Several exemplary coordinates are shown on MLO view 1420.

During a training phase, the same object detection process and feature calculator are run on a training set containing a large number of radiographic images, with and without masses and convergences indicative of malignancy. Human-interactive classification, using one or more individuals with training in interpreting radiological images, indicates malignancy or non-malignancy for each object found in the training set. Using the training set objects, features, and human-input classification truthing, a multidimensional probability density function (PDF) data set is calculated for use in classification.

Figure 15A:
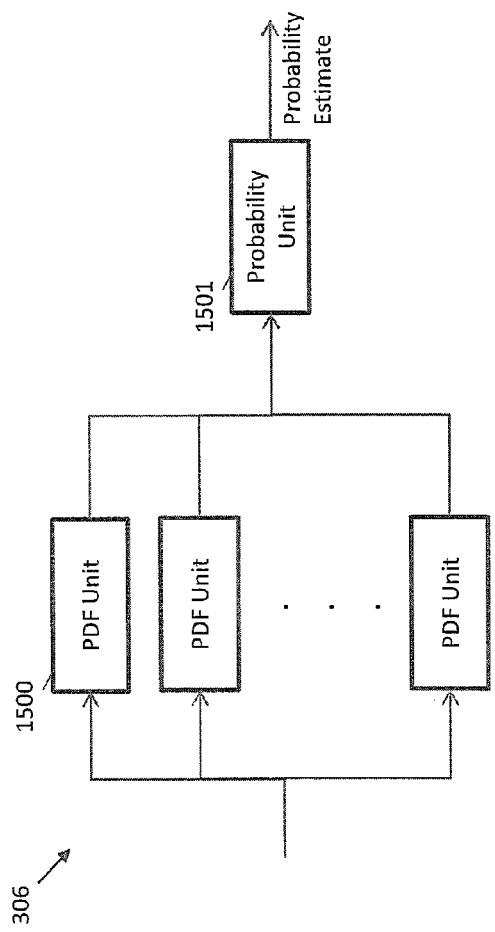
FIGS. 15a and 15b illustrate a classifier probability unit in accordance with an embodiment.
Figure 15B:
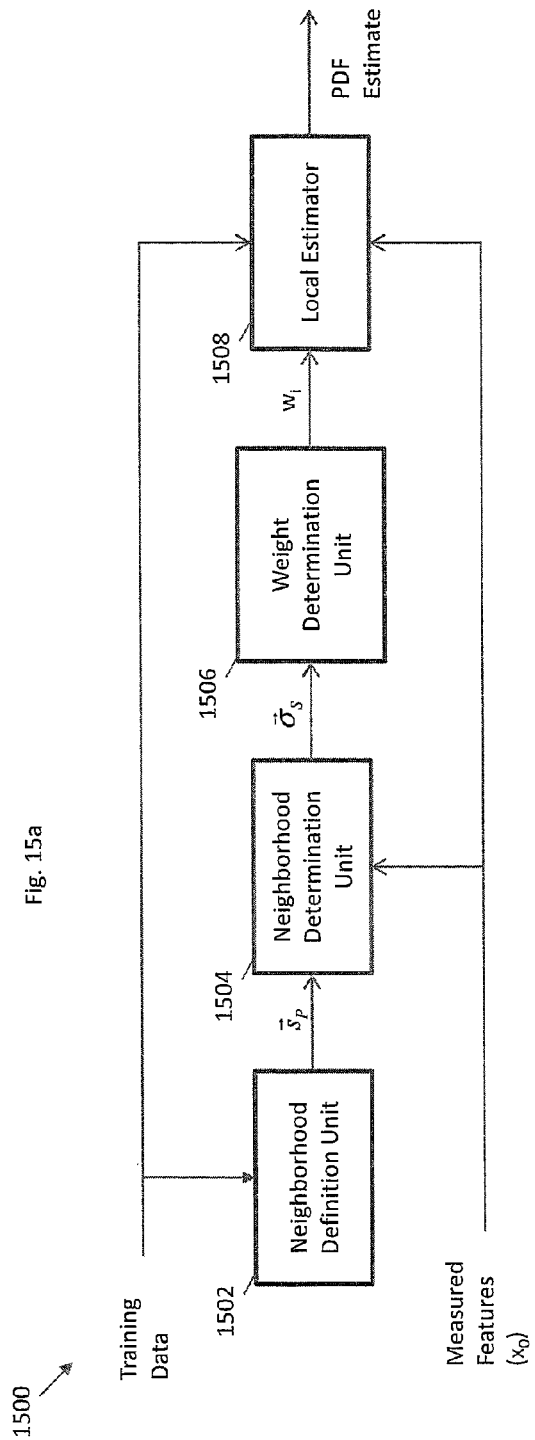

FIGS. 15a and 15b illustrate an example of a classifier 1406 that may be used in an embodiment. Generally, the classifier estimates the probability that an evaluation point belongs to a particular class by first estimating the PDF value for each of two or more classes and then combining the different class PDF values into a probability. The combining of PDF values to estimate a probability can be performed using techniques such as the well-known Bayes' law. The classifier could also use the PDF estimates to generate likelihood ratios instead of probability values. In this embodiment, the classifier 1406 includes one or more PDF units 1500 providing PDF estimates to a Probability unit 1501. Generally, the PDF units 1500 determine a PDF estimate for each possible classification for an object. For example, in an embodiment in which the classifier 1406 is utilized to classify a microcalcification, there may be a PDF unit 1500 for each of a malignant microcalcification, a benign microcalcification, a lucent microcalcification, a vascular microcalcification, a film artifact, and anything else. Greater detail regarding the PDF unit 1500 is provided below.

Referring now to FIG. 15b, a PDF estimator 1500 that may be used by the classifier 306 (see FIG. 3) in accordance with an embodiment is shown, although different classifier probability units may be utilized. A neighborhood definition unit 1502 of the PDF estimator unit 1500 functionally defines neighborhood sizes for each representation point or bin of representation points. In some embodiments a variable neighborhood size may be desirable in order to allow for a functional description that better fits the actual measured feature data. In this embodiment, the neighborhood definition unit 1502 evaluates training data received, e.g., from a database, and determines the appropriate neighborhood sizes for the representation points included in the training data. The neighborhood definition unit 1502 provides vector $\vec{s}_P$, (a vector representing scale parameters for each representation point or bin of representation points for each feature or dimension) to a neighborhood determination unit 1504. In an embodiment, the neighborhood definition unit 1502 is performed off-line and the results, e.g., 4, are stored, such as being stored in a database, for later access. The vector $\vec{s}_P$ is utilized by the neighborhood determination unit 1904 to determine a scale parameter vector $\vec{\sigma}_S$—the size of the neighborhood to be used for the evaluation point $x_0$ for each dimension or feature.

The scale parameter vector $\vec{\sigma}_S$ is provided to a weight determination unit 1506 to determine weights $w_i$, which specifies how much weight to allocate to representation points of the training data. Once determined, the weights $w_i$ are provided to a local estimator 1508. The local estimator 1508 applies the weights $w_i$ to the training data to determine PDF estimate for the point $x_0$, which may be stored, e.g., in a database. The following paragraphs provide greater detail.

PDF estimation for real-world multivariable systems with complex and/or sparse long-tailed distributions has historically been thwarted by several inherent difficulties. First, the well-studied, but highly-constrained, parametric models are often unable to accurately represent PDFs encountered in real-world applications. Second, if the models used are highly flexible or nonparametric, (for example, Parzen window based approaches) then the estimated values can be unreliable due to random sample variation. This is particularly true in the tail regions of a PDF where there are few samples. Methods to improve estimator reliability can result in intractable computation or memory requirements.

Embodiments described herein take a novel approach to PDF estimation. Instead of estimating and storing a complete PDF, a data set is stored that allows on-the-fly computation of a PDF estimator function for any specific local region in the PDF. The amount of data required to store an estimated PDF in this manner can be on the order of n×M, where n is the dimensionality of the system and M is a number of representation points, $r_i$. Each representation point represents one or more samples from the actual distribution that is being estimated. For instance, each sample in a sample set can receive its own representation point, with a unit weighting. Each sample can alternately be expressed through a representation point with a weight less than one. For instance, if two different multi-dimensional measurements are believed to originate from the same sample, each of the two samples can be given a representation point with a weight of 0.5. Finally, a representation point can "bin" several samples that are close in measurement space, by replacing the samples with a single representation point with a weight equal to the weights of the individual samples. The actual multidimensional sample value for a binned samples representation point can be the center of the bin, the mean of the binned samples, the median of the binned sample values in each dimension, etc.

In addition to the representation points, several other inputs are selected prior to performing estimation. One input is the evaluation point, $x_0$, at which the PDF is to be estimated. Another input is a vector $\vec{s}_P$, provided by the neighborhood definition unit 1502 in an embodiment, represents a set of scalar parameters that allow computation of a scale parameter vector, $\vec{\sigma}_S$. The scale parameter vector determines which of the representation points will be used in the estimation, and also can be a parameter for a function that determines the weight to be applied to each included point. Another input is the weighting function, $g(\vec{\sigma}_S)$, that will actually be applied to the representation points used in the estimation. The final input is a parameterized estimator function, $f(x_0, \theta)$, where $\theta$ is a parameter matrix for the function.

Figure 16:
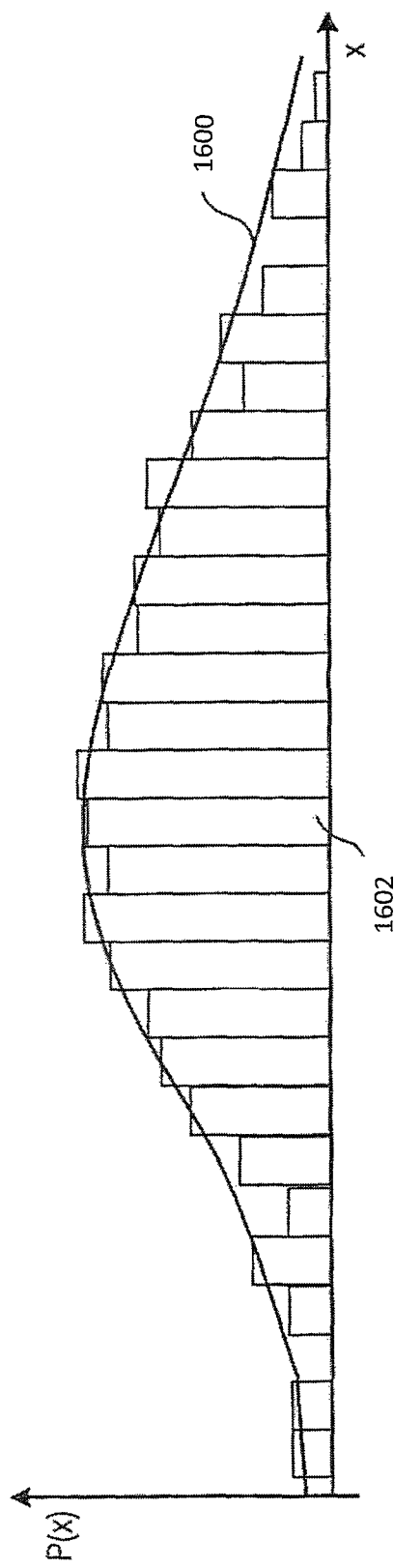
FIG. 16 illustrates a closed form PDF and a histogram of a sample distribution drawn from the probability distribution.

FIG. 16 shows a generic PDF 1600 for a one-dimensional random variable, superimposed on a histogram of a sample distribution drawn from the population of samples 1602 of the same random variable. With a large enough number of points, the histogram will tend towards a quantized version of the shape of PDF 1600, which may be estimated by a prior art technique such as a Parzen window. Towards the tails of PDF 1600, such an approach has difficulty producing a reliable estimate. The small number of samples often present in the tails means that in the tails, a simple windowed estimate either has high variance, due to the small number of samples, or fails to account for the true shape of the actual PDF, due to the application of a large linear window.

In preferred embodiments, the input data includes pre-calculated parameters from which an appropriate scale parameter can be calculated for any input evaluation point by, for example, the neighborhood determination unit 1504. Generally, the scale parameter will be larger towards the tails of the distribution, and smaller in more data-rich areas of the representation point space. Although a separate data structure can be used to store a description of the scale parameter over all sample space, in one embodiment each representation point stores parameters that can be used to calculate a scale parameter vector on the fly.

Figure 17:
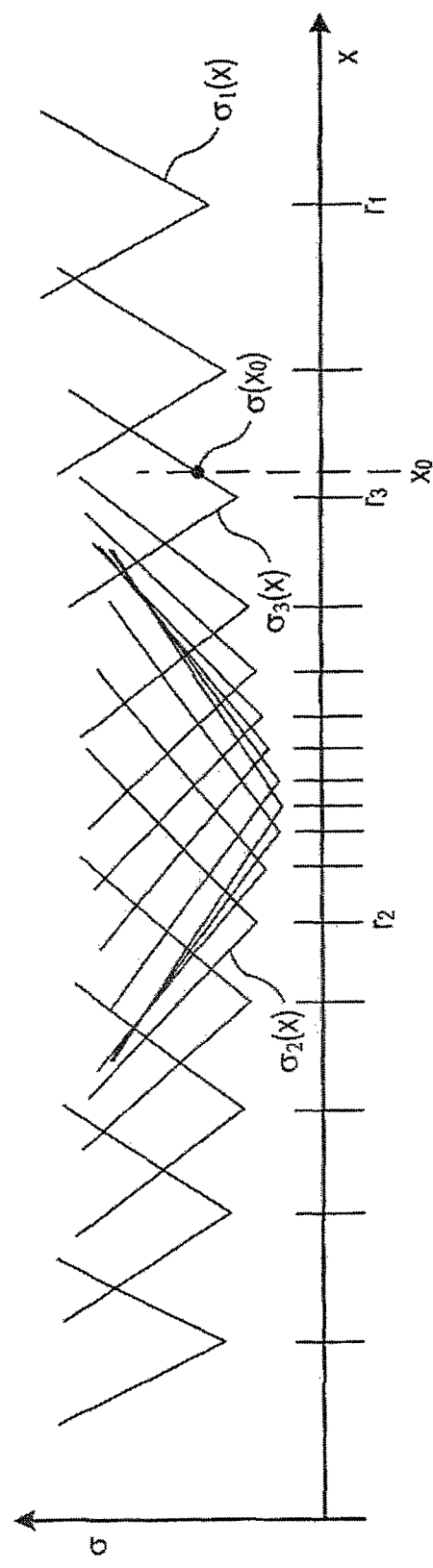
FIG. 17 shows, conceptually, estimation of a sigma value for a hypothetical one-dimensional distribution expressed by a set of representation points.

FIG. 17 illustrates one embodiment of representation-point scale parameter storage and usage, where each representation point $r_i$ also describes a minimum scale parameter value $\sigma_{MIN}(i)$ and a scale parameter slope $\sigma_{do}(i)$ for a scale parameter function $\sigma_i(x_0) = \sigma_{MIN}(i) + \sigma_{do}(i)|x_0 - r_i|$. Thus for any evaluation point $x_0$, the scale parameter function allows calculation of a scale parameter. The scale parameter for use with an evaluation point can thus be defined as the minimum scale parameter $\sigma_i(x_0)$, evaluated for all i, which minimum values $\vec{\sigma}_S$ are provided to the weight determination unit 1506. In practical applications, the scale parameter may need only be evaluated for representation points close to the evaluation point. This can be seen by an inspection of FIG. 18, where scale parameter functions $\sigma_i(x)$ are plotted for each evaluation point ($\sigma_1(x)$, for $r_1$, $\sigma_2(x)$, for $r_2$, $\sigma_3(x)$, for $r_3$, are labeled). The value $\sigma_3(x_0)$ is lower than the scale parameter function values associated with all other representation points, and is thus selected as the scale parameter for evaluation point $x_0$. Alternatively, the different scale parameter function values could be combined with mathematical functions other than "min" (for example, the mean or a particular percentile of the different values could be used).

With multiple dimensions, a different scale parameter will typically be found for each dimension, depending on the local sparseness of representation points around $x_0$ in that dimension.

Figure 18:
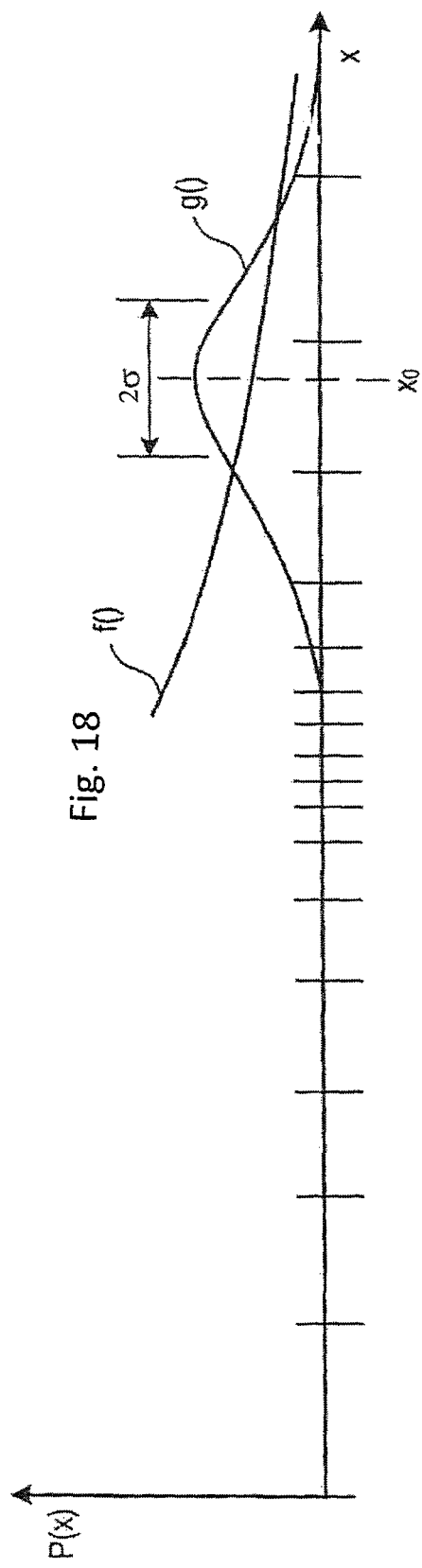
FIG. 18 shows application of the FIG. 17 sigma value to estimation of the PDF at the evaluation point.

Once the scale parameter for each dimension is found, the scale parameter can next be used to limit the representation points that will be used to estimate the PDF at the evaluation point. For instance, a practical rule of thumb based on distance from the evaluation point, such as a multiple of the scale factor, can be used to exclude representation points that practically cannot affect the calculation as illustrated in FIG. 18, thus saving computation time. Alternately, all representation points can be evaluated, no matter how far they lie from the evaluation point.

The scale parameter is also employed to calculate an overall weight for each representation point using the defined weighting function $w_i = g(r_i; x_0, \sigma(x_0))$, as illustrated by the weight determination unit 1506 (FIG. 15).

The selected, weighted representation points are used to calculate a parameter matrix, $\theta$, for the parameterized estimator function $f(x, \theta)$ calculated by the local estimator 1508. In an embodiment, the parameter matrix is calculated to maximize the function:

$$\sum_i [w_i \cdot h(f(r_i, \theta))],$$

where h( ) is a monotonic function.

For some function selections, when the modeled PDF is nonzero for all points in n-dimensional space, equations can be used to solve for the parameter matrix. In one such embodiment, the weight function g( ) is a Gaussian function, h( ) is a log function, and $f( )$ is a second-order exponential function:

$$f(x, \theta) = C \cdot e^{\theta_1 x^2 + \theta_2 x},$$

where $$C = \frac{1}{N} \frac{\sum_i g(r_i; x_0, \sigma(x_0))}{\int_x g(x; x_0, \sigma(x_0)) e^{\theta_1 x^2 + \theta_2 x}}$$

and N is the number of representation points.

In a multidimensional solution, the above equations are still applied, with the understanding that the variables and parameters are multidimensional.

The general approach described above can also be applied where the PDF has a zero value in some parts of n-dimensional space. The approach can also be applied where h, g, or $f$ are not in a directly solvable form. In such cases, the parameter matrix can be approximated using numerical methods, such as Newton-Rhapson optimization.

Once the parameter matrix for the estimator function has been found, it is now possible to evaluate the estimator function at the evaluation point to obtain a PDF value.

A wide variety of applications exist for PDF techniques according to an embodiment. Some disciplines that can benefit from accurate PDF estimation include pattern recognition, classification, estimation, computer vision, image processing, and signal processing. The compact space requirements of the PDF estimation data add practicality for PDF data set compact storage, update distribution, the inclusion of additional discriminant variables and/or classes, etc.

Although several embodiments and alternative implementations have been described, many other modifications and implementation techniques will be apparent to those skilled in the art upon reading this disclosure. In a given embodiment, the equation used to solve for the estimator function parameters can be defined such that its minimization selects the parameter matrix. The scale parameter for a given evaluation point can be calculated at runtime from the representation points directly, although good solutions for the scale parameter may be more costly to calculate without precalculation of per-representation point functions.

Unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

Figure 19:
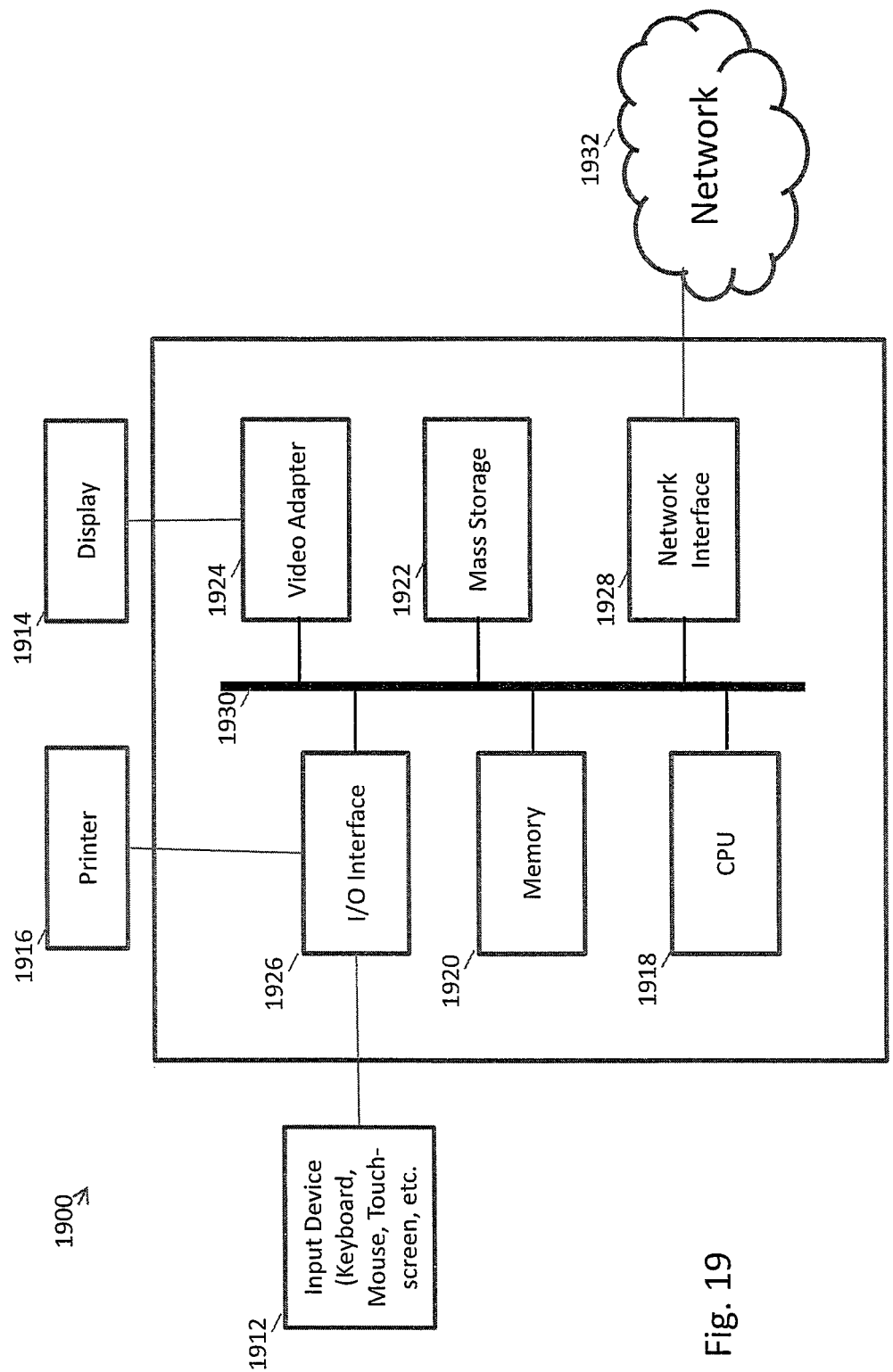
FIG. 19 is a block diagram of a desktop computing device in accordance with an embodiment of the present invention.

For example, FIG. 19 is a block diagram of a computing system 1900 that may also be used in accordance with an embodiment. It should be noted, however, that the computing system 1900 discussed herein is provided for illustrative purposes only and that other devices may be used. The computing system 1900 may comprise, for example, a desktop computer, a workstation, a laptop computer, a personal digital assistant, a dedicated unit customized for a particular application, or the like. Accordingly, the components of the computing system 1900 disclosed herein are for illustrative purposes only and other embodiments of the present invention may include additional or fewer components.

In an embodiment, the computing system 1900 comprises a processing unit 1910 equipped with one or more input devices 1912 (e.g., a mouse, a keyboard, or the like), and one or more output devices, such as a display 1914, a printer 1916, or the like. Preferably, the processing unit 1910 includes a central processing unit (CPU) 1918, memory 1920, a mass storage device 1922, a video adapter 1924, an I/O interface 1926, and a network interface 1928 connected to a bus 1930. The bus 1930 may be one or more of any type of several bus architectures including a memory bus or memory controller, a peripheral bus, video bus, or the like. The CPU 1918 may comprise any type of electronic data processor. For example, the CPU 1918 may comprise a processor (e.g., single core or multi-core) from Intel Corp. or Advanced Micro Devices, Inc., a Reduced Instruction Set Computer (RISC), an Application-Specific Integrated Circuit (ASIC), or the like. The memory 1920 may comprise any type of system memory such as static random access memory (SRAM), dynamic random access memory (DRAM), synchronous DRAM (SDRAM), read-only memory (ROM), a combination thereof, or the like. In an embodiment shown in FIG. 19, the memory 1920 may include ROM for use at boot-up, and DRAM for data storage for use while executing programs. The memory 1920 may include one of more non-transitory memories.

The mass storage device 1922 may comprise any type of storage device configured to store data, programs, and other information and to make the data, programs, and other information accessible via the bus 1928. In an embodiment, the mass storage device 1922 is configured to store the program to be executed by the CPU 1918. The mass storage device 1922 may comprise, for example, one or more of a hard disk drive, a magnetic disk drive, an optical disk drive, or the like. The mass storage device 1922 may include one or more non-transitory memories.

The video adapter 1924 and the I/O interface 1926 provide interfaces to couple external input and output devices to the processing unit 1910. As illustrated in FIG. 19, examples of input and output devices include the display 1914 coupled to the video adapter 1924 and the mouse/keyboard 1912 and the printer 1916 coupled to the I/O interface 1926. Other devices may be coupled to the processing unit 1910.

The network interface 1928, which may be a wired link and/or a wireless link, allows the processing unit 1910 to communicate with remote units via the network 1932. In an embodiment, the processing unit 1910 is coupled to a local-area network or a wide-area network to provide communications to remote devices, such as other processing units, the Internet, remote storage facilities, or the like It should be noted that the computing system 1900 may include other components. For example, the computing system 1900 may include power supplies, cables, a motherboard, removable storage media, cases, a network interface, and the like. These other components, although not shown, are considered part of the computing system 1900. Furthermore, it should be noted that any one of the components of the computing system 1900 may include multiple components. For example, the CPU 1918 may comprise multiple processors, the display 1914 may comprise multiple displays, and/or the like. As another example, the computing system 1900 may include multiple computing systems directly coupled and/or networked.

Additionally, one or more of the components may be remotely located. For example, the display may be remotely located from the processing unit. In this embodiment, display information, e.g., locations and/or types of abnormalities, may be transmitted via the network interface to a display unit or a remote processing unit having a display coupled thereto.

Although several embodiments and alternative implementations have been described, many other modifications and implementation techniques will be apparent to those skilled in the art upon reading this disclosure. Various parameters and thresholds exist and can be varied for a given implementation with given data characteristics, with experimentation and ultimate performance versus computation time tradeoffs necessary to arrive at a desired operating point. Although at least one specific method has been described for calculation of each feature type, many alternate methods and feature definitions exist for calculating similar features with similar or acceptable performance. Preferred embodiments use a PDF-classification implementation with the feature set. It is believed that the disclosed feature set and convergence location techniques can also be advantageous in CAD systems not using a PDF-classification approach. Likewise, the breast coordinate system described herein, or variants thereof, are believed to have applicability in other CAD approaches.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method for identifying spiculated anomalies in an image comprising pixels, the method comprising:
   generating a bulge mask from a digital image, the bulge mask comprising potential convergence hubs for spiculated anomalies;
   detecting ridges in the digital image to generate a detected ridges map;
   projecting the detected ridges map onto a set of direction maps having different directional vectors to generate a set of ridge direction projection maps;
   determining wedge features for the potential convergence hubs from the set of ridge direction projection maps;
   selecting ridge convergence hubs from the potential convergence hubs having strongest wedge features;
   extracting classification features for each of the selected ridge convergence hubs; and
   classifying the selected ridge convergence hubs based on the extracted classification features,
   wherein projecting the detected ridges map onto the set of direction maps comprises:
   separating the detected ridges map into a line mask image, a row component image, and a column component image; and
   determining a dot product of the line mask image, the row component image, and the column component image with the directional vectors.

2. The method of claim 1, wherein the image is a mammogram, the bulges are potentially-malignant masses, the spiculated anomalies are potentially-malignant spiculated masses, and the one or more classification features are selected from the group consisting of: wedge width, radius, signal-to-noise ratio (SNR), minimum hub contrast, nipple distance and y position, and combinations thereof.

3. The method of claim 1, wherein detecting the ridges is performed for multiple ridge widths, multiple ridge orientations, and multiple ridge aspect ratios.

4. The method of claim 3, wherein detecting the ridges comprises:
 determining an image noise map for each ridge width;
 calculating second derivative measurements at each ridge width, orientation and aspect ratio;
 determining an average contrast and contrast standard deviation from the second derivative measurements;
 determining the SNR from the average contrast and the noise map; and
 selecting the ridges to include in the detected ridges map based on relative values of at least one of SNR, contrast density, and contrast standard deviation.

5. The method of claim 4, further comprising thinning the selected ridges.

6. The method of claim 1, wherein determining the wedge features comprises:
 measuring the wedge features for multiple wedge widths, multiple wedge offsets, and multiple wedge radii; and
 generating a set of radius/wedge width maps comprising a highest SNR and respective offset for each potential convergence hub.

7. The method of claim 6, wherein selecting ridge convergence hubs comprises:
 thresholding each radius/wedge width map to a minimum significant SNR; and
 thinning contiguous groups of ridge convergence hubs to one ridge convergence hub having maximum relative SNR.

8. The method of claim 1, further comprising, before generating the bulge mask, removing bright areas from and flattening an intensity of the digital image.

9. The method of claim 1, further comprising, after classifying the selected ridge convergence hubs, marking on an output image ones of the selected ridge convergence hubs having extracted classification features exceeding a threshold.

10. A system for identifying spiculated anomalies in an image comprising pixels, the method comprising:
 a bulge mask generator generating a bulge mask from a digital image, the bulge mask comprising potential convergence hubs for spiculated anomalies;
 a ridge detector detecting ridges in the digital image to generate a detected ridges map;
 a convergence projector projecting the detected ridges map onto a set of direction maps having different directional vectors to generate a set of ridge direction projection maps;
 a wedge feature calculator determining wedge features for the potential convergence hubs from the set of ridge direction projection maps;
 a convergence hub selector selecting ridge convergence hubs from the potential convergence hubs having strongest wedge features;
 a feature extractor extracting classification features for each of the selected ridge convergence hubs; and
 a classifier classifying the selected ridge convergence hubs based on the extracted classification features,
 wherein the convergence projector separates the detected ridges map into a line mask image, a row component image, and a column component image, and determines a dot product of the line mask image, the row component image, and the column component image with the directional vectors.

11. The system of claim 10, wherein the image is a mammogram, the bulges are potentially-malignant masses, the spiculated anomalies are potentially-malignant spiculated masses, and the one or more classification features are selected from the group consisting of: wedge width, radius, signal-to-noise ratio (SNR), minimum hub contrast, nipple distance and y position, and combinations thereof.

12. The system of claim 10, wherein the ridge detector detects ridges for multiple ridge widths, multiple ridge orientations, and multiple ridge aspect ratios.

13. The system of claim 10, wherein the wedge feature calculator measures the wedge features for multiple wedge widths, multiple wedge offsets, and multiple wedge radii, and generates a set of radius/wedge width maps comprising a highest SNR and respective offset for each potential convergence hub.

14. A computer program product for identifying spiculated anomalies in an image comprising pixels, the computer program product having a non-transitory computer-readable medium with a computer program embodied thereon, the computer program comprising:
 computer program code for generating a bulge mask from a digital image, the bulge mask comprising potential convergence hubs for spiculated anomalies;
 computer program code for detecting ridges in the digital image to generate a detected ridges map;
 computer program code for projecting the detected ridges map onto a set of direction maps having different directional vectors to generate a set of ridge direction projection maps;
 computer program code for determining wedge features for the potential convergence hubs from the set of ridge direction projection maps;
 computer program code for selecting ridge convergence hubs from the potential convergence hubs having strongest wedge features;
 computer program code for extracting classification features for each of the selected ridge convergence hubs; and
 computer program code for classifying the selected ridge convergence hubs based on the extracted classification features,
 wherein projecting the detected ridges map onto the set of direction maps comprises:
 separating the detected ridges map into a line mask image, a row component image, and a column component image; and
 determining a dot product of the line mask image, the row component image, and the column component image with the directional vectors.

15. The computer program product of claim 14, wherein the image is a mammogram, the bulges are potentially-malignant masses, the spiculated anomalies are potentially-malignant spiculated masses, and the one or more classification features are selected from the group consisting of: wedge width, radius, signal-to-noise ratio (SNR), minimum hub contrast, nipple distance and y position, and combinations thereof.

16. The computer program product of claim 14, wherein the computer program code for detecting the ridges comprises:
 computer program code for detecting the ridges at multiple ridge widths, multiple ridge orientations, and multiple ridge aspect ratios;

computer program code for determining an image noise map for each ridge width;
computer program code for calculating second derivative measurements at each ridge width, orientation and aspect ratio;
computer program code for determining an average contrast and contrast standard deviation from the second derivative measurements;
computer program code for determining the SNR from the average contrast and the noise map; and
computer program code for selecting the ridges to include in the detected ridges map based on relative values of at least one of SNR, contrast density, and contrast standard deviation.

17. The computer program product of claim 14, wherein the computer program code for determining the wedge features comprises:
computer program code for measuring the wedge features for multiple wedge widths, multiple wedge offsets, and multiple wedge radii; and
computer program code for generating a set of radius/wedge width maps comprising a highest SNR and respective offset for each potential convergence hub.

18. The computer program product of claim 17, wherein the computer program code for selecting ridge convergence hubs comprises:
computer program code for thresholding each radius/wedge width map to a minimum significant SNR; and
computer program code for thinning contiguous groups of ridge convergence hubs to one ridge convergence hub having maximum relative SNR.

* * * * *